United States Patent [19]
O'Connor et al.

[11] Patent Number: 6,098,089
[45] Date of Patent: Aug. 1, 2000

[54] GENERATION ISOLATION SYSTEM AND METHOD FOR GARBAGE COLLECTION

[75] Inventors: James Michael O'Connor, Mountain View; Marc Tremblay, Palo Alto; Sanjay Vishin, Sunnyvale, all of Calif.

[73] Assignee: Sun Microsystems, Inc., Mountain View, Calif.

[21] Appl. No.: 08/841,543

[22] Filed: Apr. 23, 1997

[51] Int. Cl.⁷ ............................. G06F 12/00; G06F 17/30
[52] U.S. Cl. ............................................ 709/104; 707/206
[58] Field of Search ................................... 707/206, 103, 707/104; 711/132, 170, 200, 203, 206, 208, 221; 709/1; 395/704

[56] References Cited

U.S. PATENT DOCUMENTS

| | | | |
|---|---|---|---|
| 4,775,932 | 10/1988 | Oxley et al. | 364/200 |
| 4,797,810 | 1/1989 | McEntee et al. | 364/200 |
| 4,807,120 | 2/1989 | Courts | 364/200 |
| 4,907,151 | 3/1990 | Bartlett | 364/200 |
| 4,922,414 | 5/1990 | Holloway et al. | 364/200 |
| 4,989,134 | 1/1991 | Shaw | 364/200 |
| 5,088,036 | 2/1992 | Ellis et al. | 395/425 |
| 5,136,706 | 8/1992 | Courts | 395/600 |
| 5,218,698 | 6/1993 | Mandl | 345/650 |
| 5,293,614 | 3/1994 | Ferguson et al. | 395/600 |
| 5,321,834 | 6/1994 | Weiser et al. | 395/600 |
| 5,367,685 | 11/1994 | Gosling | 395/700 |
| 5,463,778 | 10/1995 | Johnson | 395/775 |
| 5,560,003 | 9/1996 | Nilsen et al. | 395/600 |
| 5,590,332 | 12/1996 | Baker | 395/705 |
| 5,687,368 | 11/1997 | Nilsen | 395/614 |

FOREIGN PATENT DOCUMENTS

| | | | |
|---|---|---|---|
| 0 113 460 A2 | 7/1984 | European Pat. Off. | G06F 9/44 |
| 0 737 914 A1 | 10/1996 | European Pat. Off. | G06F 9/318 |

OTHER PUBLICATIONS

Richard Jones and Rafael Lins, *Garbage Collection: Algorithms for Automatic Dynamic Memory Management*, Feb. 1997, John Wiley & Sons, entire work (previously supplied copy on reserve in the EIC library) and more particularly pp. 1–41 and 116–226 (copies enclosed).

A.L. Hosking et al.: "A Comparative Performance Evaluation of Write Barrier Implementations" ACM Sigplan Notices, vol. 27, No. 10, Oct. 1, 1992, pp. 92–109, XP000327291.

Kin–Man Chung and Herbert Yuen, "A 'Tiny' Pascal Compiler, Part 1: The P–Code Interpreter," BYTE Publications, Inc., Sep. 1978, (14 pages).

Kin–Man Chung and Herbert Yuen, "A 'Tiny' Pascal Compiler, Part 2: The P–Compiler," BYTE Publications, Inc., Oct. 1987, (10 pages).

(List continued on next page.)

*Primary Examiner*—Alvin E. Oberley
*Assistant Examiner*—Gary Scott Fourson
*Attorney, Agent, or Firm*—Skjerven, Morrill, MacPherson, Franklin & Friel, L.L.P.

[57] ABSTRACT

Architectural support for generation isolation is provided through trapping of intergenerational pointer stores. Identification of pointer stores as intergenerational is performed by a store barrier responsive to an intergenerational pointer store trap matrix that is programmably encoded with store target object and store pointer data generation pairs to be trapped. The write barrier and intergenerational pointer store trap matrix provide a programmably-flexible definition of generation pairs to be trapped, affording a garbage collector implementer with support for a wide variety of generational garbage collection methods, including remembered set-based methods, card-marking type methods, write barrier based copying collector methods, etc., as well as combinations thereof and combinations including train algorithm type methods to managing mature portions of a generationally collected memory space. Pointer specific store instruction replacement allows implementations in accordance with this invention to provide an exact barrier to not only pointer stores, but to the specific intergenerational pointer stores of interest to a particular garbage collection method or combination of methods.

31 Claims, 8 Drawing Sheets-

OTHER PUBLICATIONS

Ken Thompson, "Regular Expression Search Algorithm," *Programming Techniques,* R. M. McClure, editor, vol. 22, No. 6, Communications of the ACM, Jun. 1968, pp. 419–422.

Kenneth A. Pier, "A Restrospective on the Dorado, A High–Performance Computer," Association for Computing Machinery, 1983, pp. 252–269.

Gene McDaniel, "An Analysis of a Mesa Instruction Set," Technical Report CSL–82–2, Xerox Corporation, Palo Alto, California, May 1982, pp. 1–17.

James G. Mitchell et al, "Mesa Language Manual," Technical Report CSL–79–3, Xerox Corporation, Palo Alto, California, 1979, 80 pages.

Urs Hölzle, *A Fast Write Barrier for Generational Garbage Collectors,* OOPSLA '93 Garbage Collection Workshop, Oct. 1993, pp. 1–6.

David A. Moon, *Architecture of the Symbolics 3600,* IEEE, 1985, pp. 76–83.

Henry G. Baker, Jr., *List Processing in Real Time on a Serial Computer, Comm. ACM,* Apr. 1978, vol. 21, No. 4, pp. 280–294.

David Ungar, *Generation Scavenging: A Non–disruptive High Performance Storage Reclamation Algorithm, ACM Sigplan Notices,* May 1984, vol. 19, No. 5, pp. 157–167.

Guy L. Steele, Jr., *Multiprocessing Compactifying Garbage Collection, Comm. ACM,* Sep. 1975, vol. 18, No. 9, pp. 495–508.

Paul R. Wilson and Thomas G. Moher, Design of the Opportunistic Garbage Collector, OOPSLA '89 Proceedings, Oct. 1989, pp. 23–35, Sep. 1992, pp. 396–418.

Mario Wolczko and Ifor Williams, Multi–level Garbage Collection in a High–Performance Persistent Object System, Proceedings of the Fifth International Workshop on Persistent Object Systems, Sep. 1992, pp. 396–418.

Richard L. Hudson and J. Eliot B. Moss, *Incremental Collection of Mature Objects,* International Workshop IWMM 92, Sep. 1992, pp. 388–403.

David A. Barrett, Thesis entitled: *Improving the Performance of Conservative Generational Garbage Collection,* Technical Report CU–CS–784–95, Sep. 1995, pp. 1–64.

Robert Courts, *Improving Locality of Reference in a Garbage–Collecting Memory Management System,* Communications of the ACM, Sep. 1988, vol. 31, No. 9, pp. 1128–1138.

David A. Moon, *Garbage Collection in a Large Lisp System,* 1984, pp. 235–246.

GENERATION ISOLATION SYSTEM AND METHOD FOR GARBAGE COLLECTION

BACKGROUND OF THE INVENTION

1. Field of the Invention

The present invention relates to garbage collection, and in particular, to systems and methods for isolating generations in garbage collectors.

2. Description of the Related Art

Traditionally, most programming languages have placed responsibility for dynamic allocation and deallocation of memory on the programmer. For example, in the C programming language, memory is allocated from the heap by the malloc procedure (or its variants). Given a pointer variable, p, execution of machine instructions corresponding to the statement p=malloc (sizeof (SomeStruct)) causes pointer variable p to point to newly allocated storage for a memory object of size necessary for representing a SomeStruct data structure. After use, the memory object identified by pointer variable p can be deallocated, or freed, by calling free (p). Pascal and C++ languages provide analogous facilities for explicit allocation and deallocation of memory.

Unfortunately, dynamically allocated storage may become unreachable if no reference, or pointer, to the storage remains in the set of root reference locations for a given computation. Memory objects that are no longer reachable, but have not been freed, are called garbage. Similarly, storage associated with a memory object can be deallocated while still referenced. In this case, a dangling reference has been created. In general, dynamic memory can be hard to manage correctly. In most programming languages, heap allocation is required for data structures that survive the procedure that created them. If these data structures are passed to further procedures or functions, it may be difficult or impossible for the programmer or compiler to determine the point at which it is safe to deallocate them.

Because of this difficulty, garbage collection, i.e., automatic reclamation of heap-allocated storage after its last use by a program, can be an attractive alternative model of dynamic memory management. Garbage collection is particularly attractive for functional languages, such as the JAVA™ language (JAVA is a trademark of Sun Microsystems, Inc.), Prolog, Lisp, Smalltalk, Scheme, Eiffel, Dylan, ML, Haskell, Miranda, Oberon, etc., which exhibit data sharing, delayed execution, and generally, less predictable execution orders than the procedural languages. See generally, Jones & Lins, *Garbage Collection: Algorithms for Automatic Dynamic Memory Management*, pp. 141, Wiley (1996) for a discussion of garbage collection and the classical algorithms therefor.

Three classical garbage collection methods are reference counting, mark-sweep, and copying storage reclamation. The first, reference counting, is based on maintaining a count of the number of references, e.g., pointers, to each memory object from active memory objects or root reference locations. When a new memory object is allocated and a pointer thereto is assigned, the memory object's reference count is set to one. Then, each time a pointer is set to refer to the memory object, the memory object's reference count is incremented. When a reference to the memory object is deleted or overwritten, the reference count is decremented. Memory objects with a reference count of zero are unreachable and can be collected as garbage. A reference counting garbage collector implementation typically includes an additional field, the reference count, in each memory object and includes incrementing and decrementing support as part of new object, delete object and update pointer functions.

In contrast, tracing collector methods involve traversal of reference chains through memory to identify live, i.e., referenceable, memory objects. One such tracing collector method is the mark-sweep method in which reference chains through memory are traversed to identify and mark live memory objects. Unmarked memory objects are garbage and are collected and returned to the free pool during a separate sweep phase. A mark-sweep garbage collector implementation typically includes an additional field, e.g., a mark bit, in each memory object. Mark-compact collectors add compaction to the traditional mark-sweep approach. Compaction relocates live objects to achieve beneficial reductions in fragmentation. Reference count methods may also employ compaction.

Another tracing method, copying collection, divides memory (or a portion thereof) into two semi-spaces, one containing current data and the other containing old data. Copying garbage collection begins by reversing the roles of the two semi-spaces. The copying collector then traverses the live objects in the old semi-space, FromSpace, copying reachable objects into the new semi-space, ToSpace. After all the live objects in FromSpace have been traversed and copied, a replica of the data structures exists in ToSpace. In essence, a copying collector scavenges live objects from amongst the garbage. A beneficial side effect of copying collection is that live objects are compacted into ToSpace, thereby reducing fragmentation.

Generational approaches build on the observations that (1) memory objects typically die young and that (2) tracing methods spend considerable resources traversing, copying, or relocating comparatively long-lived objects. Generational garbage collection schemes divide the heap into two or more generations, segregating objects by age, and concentrate collection efforts (or at least more vigorous collection efforts) on the younger generation(s). Since the youngest generation can be small, garbage collection related pause times can, on average, be kept short. Garbage collection within a generation can be by copying, mark-sweep, or other garbage collection method. To implement a generational collector, it is vital that a mutator process, the garbage collector or some combination of both identify intergenerational pointers so they can be treated as part of a root set by the garbage collector. A mutator is a process which changes the graph of reference chains through memory in the process of performing useful work, apart from garbage collection, in a computer system.

Intergenerational pointers typically arise either through mutator process pointer stores or through promotion of objects containing pointers. Promoted intergenerational pointers can easily be detected by a collector process upon promotion. However, short of scanning older generations for pointers into younger generations—a costly process—pointer stores must be trapped and recorded to detect intergenerational pointer stores. Barriers are well known and have been implemented in hardware, in software, or with operating system (typically paging system) support. See generally, Jones & Lins, *Garbage Collection: Algorithms for Automatic Dynamic Memory Management*, pp. 165–74, Wiley (1996) (discussing intergenerational pointers, write barriers, entry tables, remembered sets, sequential store buffers, page marking with hardware support, page marking with virtual memory support, and card marking).

If software techniques, such as in-line code for pointer store checking, are used, the execution time and in-line code space overheads can be significant. One example of a software write barrier is that proposed by Ungar (see David M. Ungar, *Generation Scavenging A Non-disruptive High Performance Storage Reclamation Algorithm,* ACM SIG-PLAN Notices, 19(5), pp. 157–67 (1984)), which intercepted stores to check whether (1) a pointer was being stored and (2) whether the pointer was to a younger generation object and was being stored into an older generation object. If so, the address of the older generation object was added to a remembered set. Software barriers can impose a large amount of overhead on the operations to which they apply. For example, a software'store barrier provided by in-lined code adds additional instruction latencies, e.g., to check whether a pointer is being stored and whether the pointer is intergenerational, and increases the total volume of code. Such code increases may adversely affect cache performance.

An alternative to such a software barrier is to use an operating system's virtual memory page protection mechanisms to trap accesses to protected pages or to use page modification dirty bits as a map of pages potentially containing an object with an updated intergenerational pointer field. Such techniqes typically defer identifications of pointer stores, and more particularly intergenerational pointer stores, from amongst all stores until collection time. However, virtual memory page sizes are not generally well suited to garbage collection service. For example, pages tend to be large as compared with objects and virtual memory dirty bits record any modification to the associated page, not simply pointer stores. As a result the costs of scanning a page for intergenerational pointers can be high.

Another alternative to an inlined code software write barrier is hardware barrier support. Although, many write barrier implementations do not discriminate between pointer and non-pointer stores, and instead simply record all writes while deferring checks for intergenerational pointers to collection time, the extensive use of hardware support for garbage collection in the Symbolics 3600 allowed efficient implementation of a page marking scheme. Three features of the Symbolics 3600 made this feasible. First, a hardware write barrier ignored any word that was not a pointer to generational data. Whenever a reference to generational memory was stored into a page, the write-barrier hardware set a corresponding bit in the garbage collection page table. Second, a tagged architecture removed the need to consider object boundaries while performing collection time checks for intergenerational pointers since pointer words could always be distinguished from non-pointer words using tags. The Symbolics 3600 accomodated a 2-bit major data type tag, a 4-bit minor tag and a 28-bit address in a 36-bit word. Finally, pages were smaller—at 256 words—than typical virtual memory pages, so a page could be scanned rapidly at collection time. See Jones & Lins, *Garbage Collection: Algorithms for Automatic Dynamic Memory Management,* pp. 169–70, Wiley (1996) (discussing page marking with hardware support on the Symbolics 3600); see also Moon, *Architecture of the Symbolics 3600, In Proceedings of the 12th Annual International Symposium on Computer Architecture,* pp. 76–83 (1985) (discussing stored representations of objects).

The process of identifying intergenerational pointers can require significant collection-time scanning. One improvement is to segment collected memory space (e.g., the heap) into small regions called cards. Card marking offers several advantages provided that the cards are of the right size. Since they are smaller than virtual memory pages, the amount of collection-time scanning can be reduced. On the other hand, the amount of space occupied by a card table is less than that required for a word-by-word marking scheme. In general, a bit is set unconditionally in a card table whenever a word in the card is modified. Card marking collectors must scan dirty cards for intergenerational pointers at collection time. The cost of scanning cards is proportional to the number and size of cards marked, rather than to the number of stores performed, since duplicates never arise. See Wilson and Moher, *Design of the Opportunistic Garbage Collector,* ACM SIGPLAN Notices, 24(10), pp. 23–35 (1989).

Although generational approaches can be very effective at reducing total garbage collection time and the majority of collections can be non-disruptive, collections of older generations can be disruptive. To collect these older generations of objects in a non-disruptive manner, Hudson and Moss proposed an algorithm that processes bounded-size areas of a mature object space at each collections. The algorithm is incremental in nature and guarantees eventual collection of any and all garbage. Hudson and Moss use a train analogy to describe their solution to the problem, with carriages representing bounded size areas and trains representing groups of carriages holding linked structures. The system is efficient in that it does not rely on special hardware or virtual memory mechanisms. See Hudson and Moss, *Incremental Collection of Mature Objects,* Proceedings of International Workshop on Memory Management, St. Malo France (Sep. 16–18, 1992).

SUMMARY OF THE INVENTION

The present invention provides systems, methods, apparati, and computer program products embodying such systems, methods, and apparati for facilitating implementations of garbage collectors. In particular, the present invention provides architectural support for generation isolation through trapping of intergenerational pointer stores. Identification of pointer stores as intergenerational is performed by a store barrier responsive to an intergenerational pointer store trap matrix that is programmably encoded with store target object and store pointer data generation pairs to be trapped. The write barrier and intergenerational pointer store trap matrix provide a programmably-flexible definition of generation pairs to be trapped, affording a garbage collector implementer with support for a wide variety of generational garbage collection methods, including remembered set-based methods, card-marking type methods, write barrier based copying collector methods, etc., as well as combinations thereof and combinations including train algorithm type methods to managing mature portions of a generationally collected memory space.

Pointer specific store instruction replacement allows implementations in accordance with the present invention to provide an exact barrier to not only pointer stores, but to the specific intergenerational pointer stores of interest to a particular garbage collection method or combination of methods, including garbage collection methods hereafter developed. The exact identification of pointer stores herein does not require tags encoded in-line with collected memory storage and does not require non-standard word sizes to support such tags.

The present invention is particularly amenable to hardware register implementations of an intergenerational pointer store trap matrix and to logic implementations of garbage collection trap triggering equations in accordance with contents of such hardware registers. Nonetheless, alternate stores or encodings of the intergenerational pointer store trap matrix and firmware or microcode implementations of garbage collection trap triggering equations are also suitable. Furthermore, general or special purpose software embodiments are also suitable, particularly in software virtual machine instruction processor implementations for execution on a hardware processor. Execution time replacement of pointer non-specific instructions with pointer-specific instructions allows non-pointer store instructions to bypass intergenerational pointer store trap checks; however, some embodiments may forgo this advantageous feature. These and other variations fall within the scope of claims which follow.

In one embodiment in accordance with the present invention, an apparatus includes dynamically allocated storage, an intergenerational pointer store trap matrix, and a write barrier to intergenerational pointer stores. References to objects formed in the dynamically allocated storage have associated generation membership tags. The write barrier traps a store instruction responsive to selected correspondences between respective generation membership tags of a target object-reference and of object reference data being stored into a target object identified by the target object reference. The selected correspondences are encoded by the intergenerational pointer store trap matrix.

In a further embodiment, the apparatus includes a virtual machine instruction processor which itself includes a representation of the intergenerational pointer store trap matrix. The write barrier includes pointer specific store instruction codes executable on the virtual machine instruction processor. Execution of the pointer specific store instruction codes includes determining, based on generation tags respectively associated with the target object reference and the object reference data, whether a particular execution of one of the pointer specific store instructions will store an intergenerational pointer indicated as for trapping by said intergenerational pointer store trap matrix. If so, execution of the pointer specific store instruction codes includes trapping to a garbage collection fault handler.

In another embodiment in accordance with the present invention, a method for trapping intergenerational pointer stores includes forming an intergenerational pointer store trap matrix in computer readable storage, indexing into the intergenerational pointer store trap matrix and selectively trapping based on upon a trap indication encoded at an element of the intergenerational pointer store trap matrix so indexed. The indexing uses generation membership tags respectively associated with a target object reference and object reference data being stored thereinto by a mutator process store operation.

In yet another embodiment in accordance with the present invention, architectural support for trapping intergenerational pointer stores includes an intergenerational pointer store trap matrix and write barrier means. The write barrier means are responsive to the intergenerational pointer store trap matrix Evaluation of a store by a mutator process triggers a garbage collection fault handler if (1) a target memory object of said store has an associated first generation tag and object reference data of the store has an associated second generation tag and (2) the intergenerational pointer store trap matrix encodes a trap directive for a first generation target memory object and second generation object reference data pair.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

The following sets forth a detailed description of the best contemplated mode for carrying out the invention. The description is intended to be illustrative of the invention and should not be taken to be limiting.

Architectural support described herein for isolation of garbage collection generations includes an intergenerational pointer store trap matrix, object reference generation tagging, a write barrier responsive the intergenerational pointer store trap matrix and object reference generation tagging, a garbage collection trap handler, and facilities for selective dynamic replacement of pointer-non-specific instructions with pointer-specific instructions with write barrier support.

In general, embodiments in accordance with the present invention may employ various aspects of such architectural support for isolating generations in a garbage collected system. Although such architectural support may be provided in hardware, in software, or in a combination of hardware and software, embodiments in which the architectural support is provided substantially in hardware will typically provide both increased performance and reduced memory requirement advantages. For this reason, an exemplary hardware virtual machine instruction processor embodiment is described herein. However, based on this description, those of skill in the art will appreciate alternative embodiments including embodiments based on software (e.g., interpreter, just-in-time compiler, etc.) implementations of a virtual machine instruction processor which fall within the scope of the claims which follow.

A JAVA Virtual Machine Instruction Processor Embodiment

Figure 1:
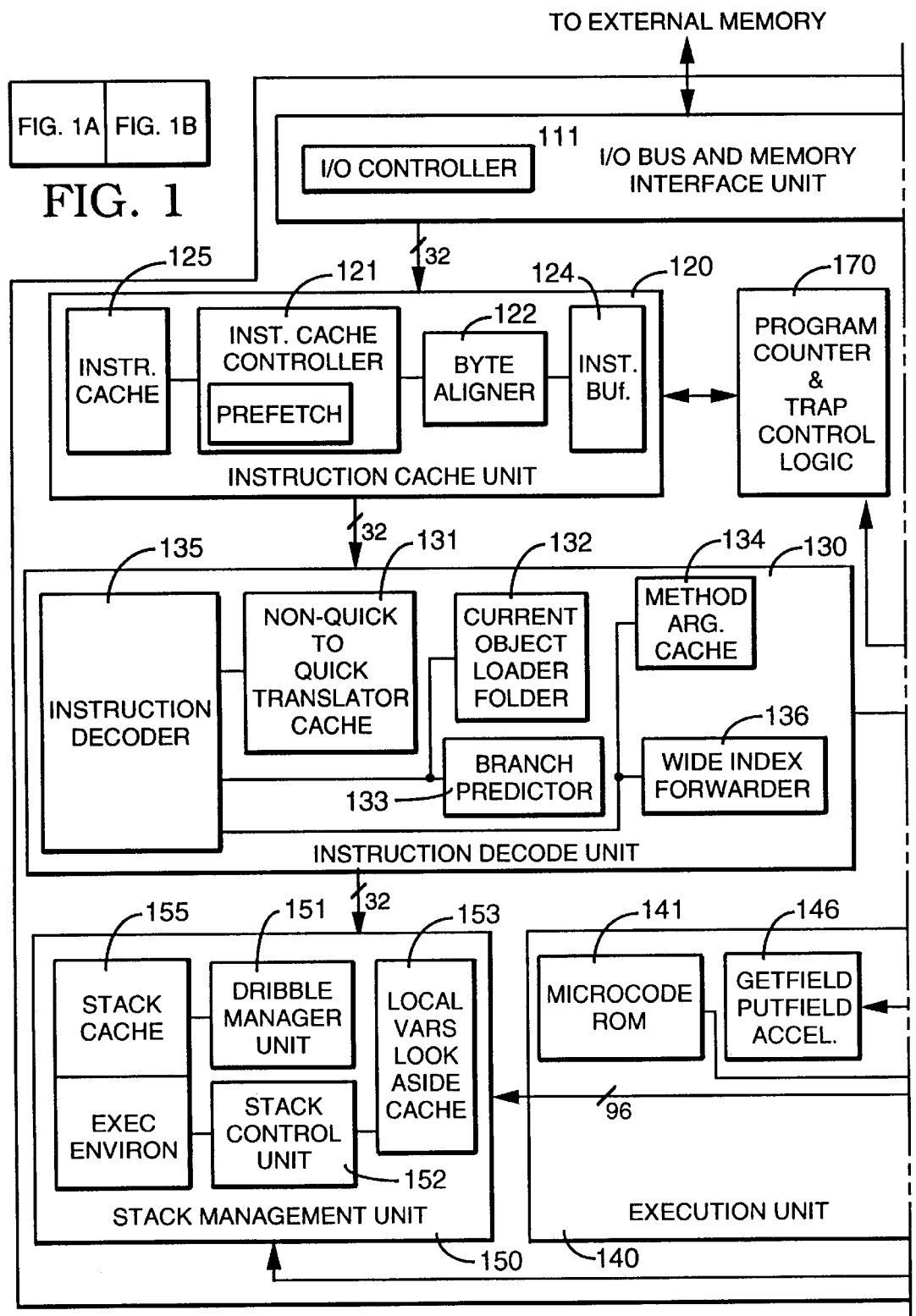
FIG. 1 is a block diagram of an exemplary embodiment of a virtual machine hardware processor that includes support for garbage collection generation isolation in accordance with this invention.
Figure 1B:
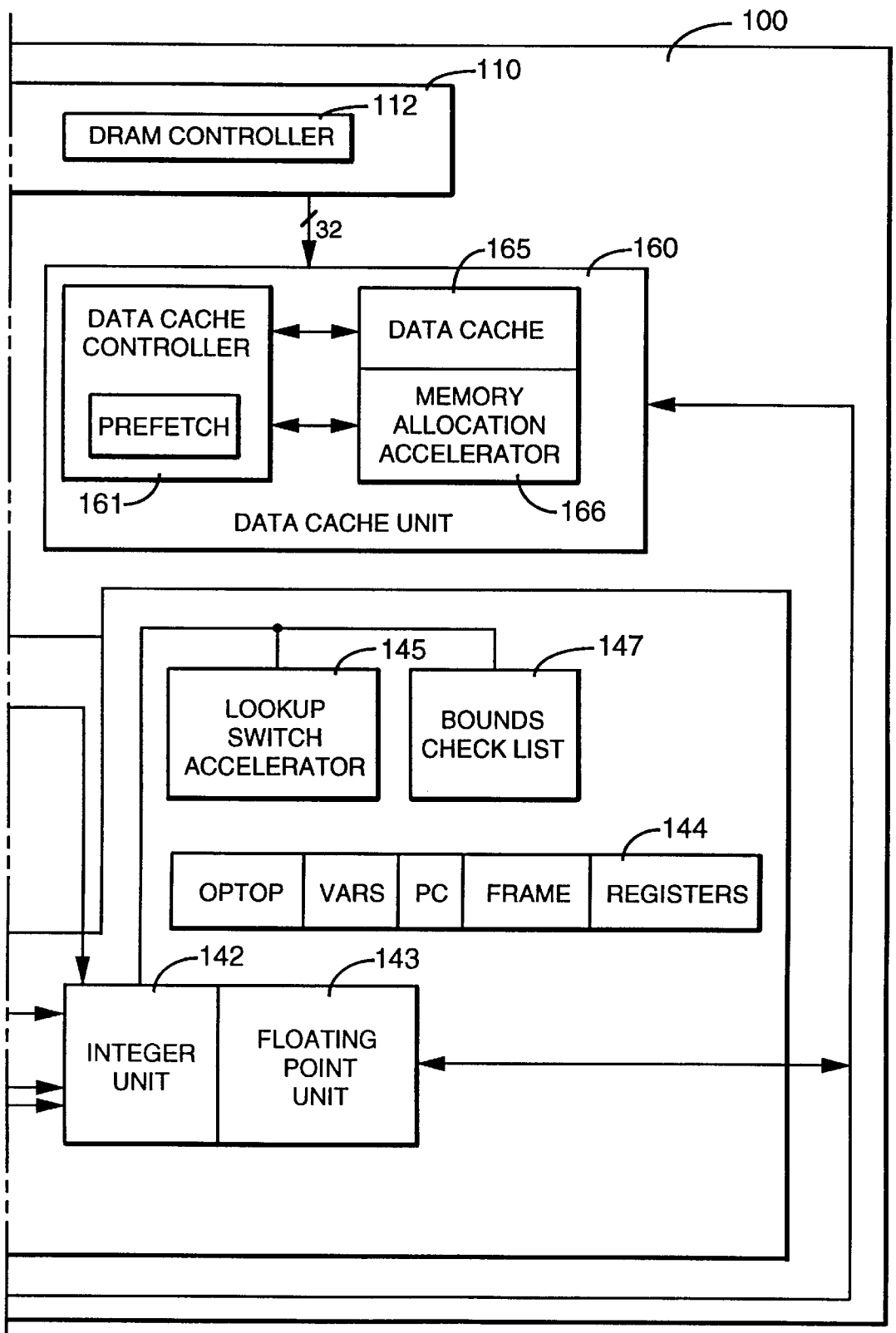

FIG. 1 depicts an exemplary hardware embodiment of a virtual machine instruction processor 100, hereinafter hardware processor 100, that includes support for bounded pause time relocating garbage collection in accordance with the present invention, and that directly executes processor architecture independent JAVA virtual machine instructions. The performance of hardware processor 100 in executing virtual machine instructions is typically better than high-end CPUs, such as the Intel PENTIUM microprocessor or the Sun Microsystems ULTRASPARC processor, (ULTRASPARC is a trademark of Sun Microsystems of Mountain View, Calif., and PENTIUM is a trademark of Intel Corp. of Sunnyvale, Calif.) interpreting the same virtual machine instructions with a software JAVA interpreter. In addition, the performance of hardware processor 100 is better than some high-end CPU's with a JAVA just-in-time (JIT) compiler. Hardware processor 100 is low cost and exhibits low power consumption. As a result, hardware processor 100 is well suited for portable applications.

Because hardware processor 100 provides a JAVA virtual machine instruction processor implementation substantially in hardware, 25–50 Kilobytes (Kbytes) of memory storage, e.g., read-only memory or random access memory, otherwise required by a software interpreter can be eliminated or alternatively allocated. Hardware support for garbage collection provides further advantages for a limited memory JAVA virtual machine implementation by reducing in-line code for garbage collection (e.g., compiler supplied read and/or write barrier support), by facilitating improved utilization of limited memory, and by reducing garbage collection overheads and pause times. In environments where the expense of a large memory is prohibitive, including, for example, an Internet chip for network appliances, a cellular telephone processor, other telecommunications integrated circuits, or other low-power, low-cost applications such as embedded processors, and portable devices, hardware processor 100 is advantageous.

Even in environments where large memory is viable, hardware support for garbage collection reduces overheads associated with barrier implementations, facilitates improved utilization of memory, and reduces pause times for relocating garbage collector implementations. In particular, hardware processor 100 provides advantages for garbage collection methods and implementations in the context of an exemplary JAVA virtual machine implementation. However, based on the description herein, those of skill in the art will recognize variations for other JAVA virtual machine implementations, including e.g., interpreted and JIT compiler JAVA virtual machine implementations, as well as for other non-JAVA virtual machine implementations.

As used herein, a virtual machine is an abstract computing machine that, like a real computing machine, has an instruction set and uses various memory areas. A virtual machine specification defines a set of processor architecture independent virtual machine instructions that are executed by a virtual machine implementation. In general, a virtual machine implementation may be in hardware (e.g., as in the case of hardware processor 100), in software (e.g., as in the case of interpreted and JIT compiler implementations), or in hardware and software. Each virtual machine instruction defines a specific operation that is to be performed. The virtual machine need not understand the computer language that is used to generate virtual machine instructions or the underlying implementation of the virtual machine. Only a particular format for virtual machine instructions needs to be understood. In an exemplary embodiment, the virtual machine instructions are JAVA virtual machine instructions. Each JAVA virtual machine instruction includes one or more bytes that encode instruction identifying information, operands, and any other required information.

In this embodiment, hardware processor 100 (FIG. 1) processes the JAVA virtual machine instructions, which include bytecodes. Hardware processor 100 directly executes most of the bytecodes. However, execution of some of the bytecodes is implemented via microcode. Lindholm & Yellen, The JAVA™ *Virtual Machine Specification* (Addison-Wesley, 1996), ISBN 0-201-63452-X, which is incorporated herein by reference in its entirety, includes an exemplary set of JAVA virtual machine instructions. The particular set of virtual machine instructions supported by a hardware processor 100 is not an essential aspect of this invention. However, in view of the virtual machine instructions, those of skill in the art can modify the invention for a particular set of virtual machine instructions, or for changes to the JAVA virtual machine specification.

In one embodiment, hardware processor 100 includes an I/O bus and memory interface unit 110, an instruction cache unit 120 including instruction cache 125, an instruction decode unit 130 including non-quick to quick translator cache 131, a unified execution unit 140, a stack management unit 150 including stack cache 155, a data cache unit 160 including data cache 165, and program counter and trap control logic 170. Support for garbage collection features described herein resides primarily in integer unit 142 and registers 144 of execution unit 140 with some additional support in program counter and trap control logic 170 (including e.g., support for forcing the program counter to a next JAVA virtual machine instruction following a trapping store). In one embodiment, non-quick to quick translator cache 131 facilitates pointer-specificity for hardware write barrier logic of integer unit 142. Each of these units is described below. In addition, an exemplary embodiment of hardware processor 100 is described in greater detail in a described in greater detail in a co-pending U.S. patent application Ser. No. 08/786,351, now U.S. Pat. No. 6,026,405, entitled, "INSTRUCTION FOLDING FOR A STACK-BASED MACHINE," naming James Michael O' Connor and Marc Tremblay as inventors, filed Jan. 23, 1997, the detailed description of which is hereby incorporated by reference.

Figure 2:
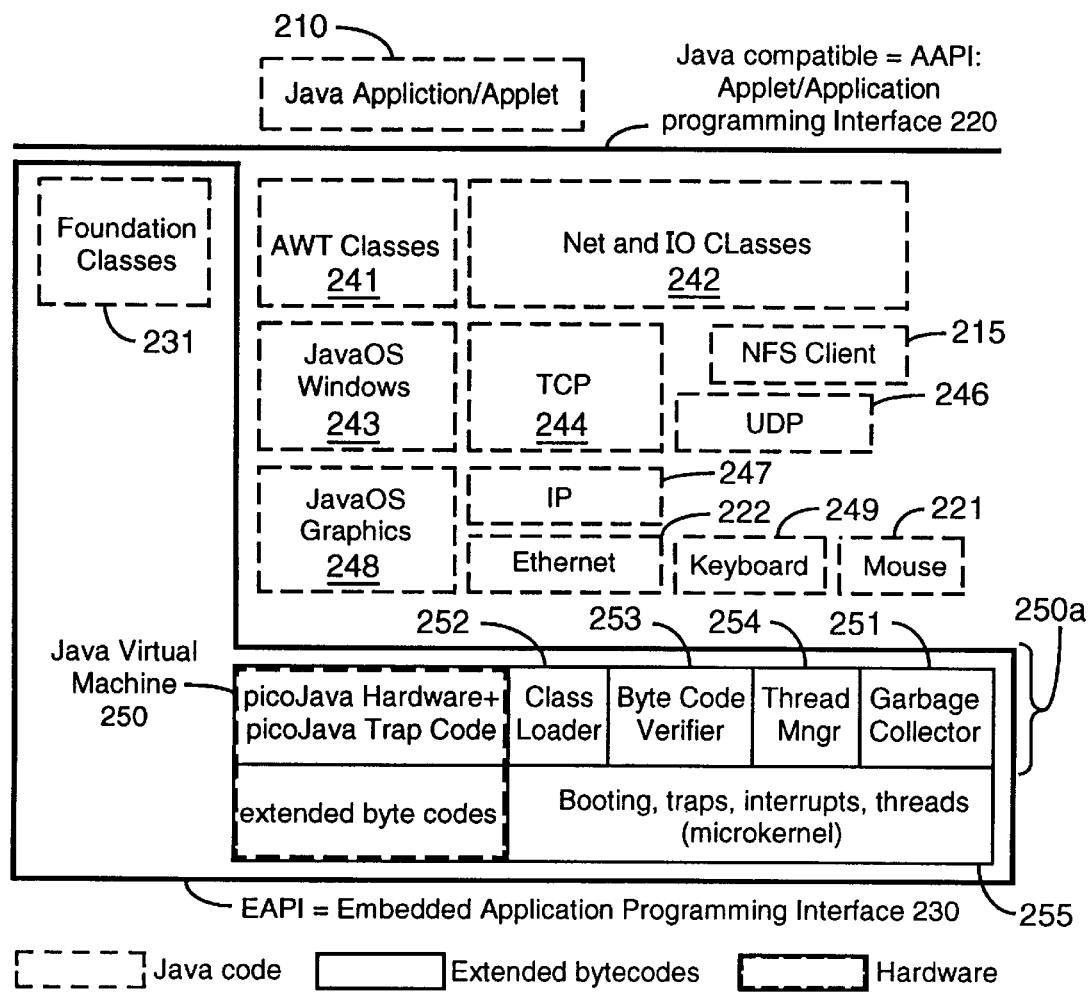
FIG. 2 depicts "builds upon" relationships between software and hardware components of a JAVA application environment including hardware processor (FIG. 1) and software components of an exemplary JAVA virtual machine implementation.

FIG. 2 depicts a "builds upon" relationship between software and hardware components of a JAVA application environment such as, for example, an application environment partially defined by and partially executable on hardware processor 100 (FIG. 1). JAVA application/applet software 210 exploits software components defining an applet/application programming interface 220 including AWT classes 241, net and I/O classes 242, and JAVA OS windows 243, JAVA OS graphics 248, TCP 244, NFS 245, UDP 246, IP 247, Ethernet 222, keyboard 249, and mouse 221 software components, which in one embodiment include JAVA bytecodes. In the embodiment of FIG. 2, JAVA OS graphics 248 and Ethernet 222 software components also include extended bytecodes beyond those defined by the baseline JAVA Virtual Machine Specification. Components of an embedded application programming interface (EAPI) 230 include foundation classes 231 and hardware and software components of JAVA virtual machine implementation 250 in accordance with the JAVA Virtual Machine Specification.

JAVA virtual machine implementation 250 includes hardware processor 100 and trap code executable thereon to evaluate JAVA virtual machine instructions. In addition, JAVA virtual machine implementation 250 includes hardware support for extended bytecodes (including e.g., pointer store bytecodes and memory access barriers described below in the context of garbage collection); class loader 252, byte code verifier 253, thread manager 254, and garbage collector 251 software, and microkernel 255. JAVA virtual machine implementation 250 includes a JAVA virtual machine specification compliant portion 250a as well as implementation dependent portions. Although the JAVA virtual machine specification specifies that garbage collection be provided, the particular garbage collection method employed is implementation-dependent.

Architectural features for garbage collection described herein in the context of an exemplary hardware processor 100 embodiment of JAVA virtual machine implementation 250 are particularly adapted for generational garbage collection methods. However, based on this description, those of skill in the art will recognize the application of bounded-pause time support of this invention to relocating collectors in general, including e.g., non-generational collector implementations, incremental mark-compact collectors, copying collectors, etc.

Figure 3:
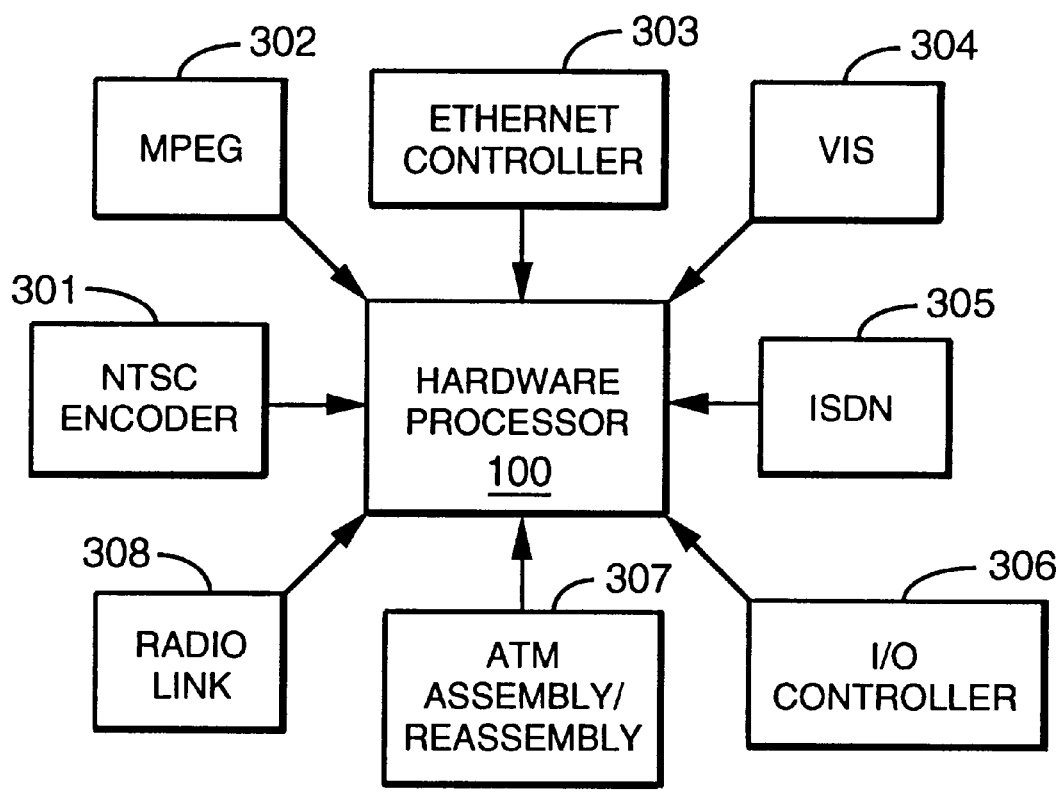
FIG. 3 illustrates several possible add-ons to the hardware processor of FIG. 1.

FIG. 3A illustrates several possible add-ons to hardware processor 100 to create more complicated system. Circuits supporting any of the eight functions shown, i.e., NTSC encoder 301, MPEG 302, Ethernet controller 303, VIS 304, ISDN 305, I/O controller 306, ATM assembly/reassembly 307, and radio link 308 can be integrated into the same chip as hardware processor 100 of this invention.

In addition, those of skill in the art will appreciate a wide variety of computer systems incorporating hardware processor 100, including embodiments of hardware processor 100 with any of the above-described add-on circuits. An exemplary computer system 300 embodiment includes physical memory storage (e.g., RAM and/or ROM), computer readable media access devices (e.g., disk, CD-ROM, tape, and/or memory technology based computer readable media access devices, etc.), input/output device interfaces (e.g., interfaces for keyboard and/or pointing devices, for display devices, etc.), and communications devices and/or interfaces. Suitable communications devices and/or interfaces include those for network- or telephony-based communications, for interfacing with communications networks including land-line and/or wireless portions of a public switched network, private networks, etc. In some embodiments of this invention, instruction streams (including e.g., JAVA bytecodes) are transmitted and/or received for execution by hardware processor 100 via such communications devices or interfaces.

Architectural Support for Garbage Collection

Hardware processor 100 provides architectural support for a variety of garbage collection methods, including generational collector methods implemented as garbage collection software executable thereon. In particular, hardware processor 100 includes programmable store filtering, tagged object reference and object header formats, and extended bytecode support.

Programmable Store Filtering

Figure 4:
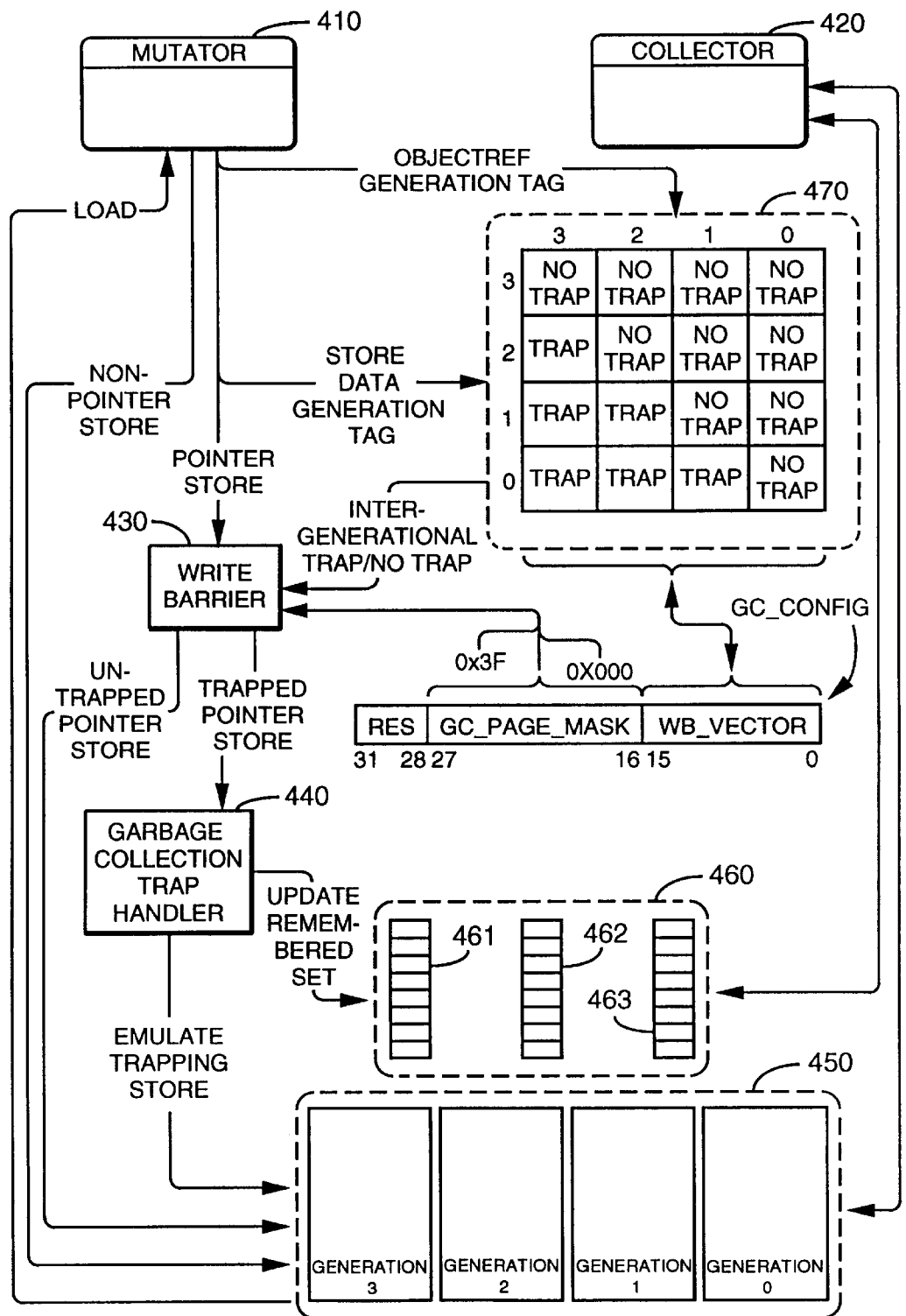
FIG. 4 depicts operation of a write barrier provided in accordance with an embodiment of this invention for trapping intergenerational and card boundary crossing pointer stores made by a mutator process executing on the hardware processor of FIG. 1.

FIG. 4 depicts one embodiment of a supervisor-writable register GC_CONFIG that supports programmable filtering of stores to the heap. In the context of FIG. 1, register GC_CONFIG, is included in registers 144 and is accessible to execution unit 140. In one embodiment, 12 bits of register GC_CONFIG define a field GC_PAGE_MASK for use in selecting a page size for inter-page pointer store checks. The 12 bits of field GC_PAGE_MASK are used as bits 23:12 of a 32-bit garbage collection page mask, with an additional 8 more-significant bits defined as 0x3F and 12 less-significant bits defined as 0x000. The resulting 32-bit garbage collection page mask is used to create a store barrier to pointer stores that cross a programmable garbage collection page boundary. Both the store data value and the objectref target of a pointer store (e.g., an aputfield_quick instruction operating on value and objectref residing at the top of an operand stack represented at stack cache 155) are effectively masked by the 32-bit garbage collection page mask and compared to determine if value (itself an objectref) points to a different garbage collection page than that in which the target object resides. In this way, the garbage collection page size is independent of virtual memory page size. Furthermore, garbage collection pages can be provided in computer system and operating system environments, such as in low-cost, low power portable device applications or internet appliance applications, without virtual memory support. In the embodiment of FIG. 4, register GC_CONFIG allows programmable definition of a garbage collection page size ranging from 4 KBytes to 8 Mbytes, although, based on this description, suitable modifications for other garbage collection page sizes and size ranges will be apparent to those of skill in the art.

Register GC_CONFIG also includes a field WB_VECTOR for programmably defining an intergenerational pointer store trap matrix Field WB_VECTOR encodes generation pairs for which a pointer store having a pointer data generation associated with the store data value and a target object generation associated with the objectref target thereof will trap. In the embodiment of FIG. 4, field WB_VECTOR effectively defines a 4×4 matrix of 1-bit indications for pointer data and target object generation pairs for which a garbage collection trap is desired. Other embodiments may define larger or smaller matrices and may optionally encode additional states (e.g., no_trap, gc_notify1, gc_notify2, and gc_notify3).

Referring to the embodiment of FIG. 4, two bit tags of the target object's objectref are concatenated with the two tag bits of the value being stored thereinto to form a 4-bit index into field WB_VECTOR Each of the two bit tags encodes generation membership information as described below. The indexed bit of field WB_VECTOR then encodes whether a write barrier traps the corresponding pointer store. Field WB_VECTOR can be programmably configured to encode trapping of all intergenerational pointer stores (i.e., of all pointer stores where the pointer data generation and the target object generation are not equal), of all pointer stores (intergenerational as well as within a generation), of younger generation pointer stores (i.e., stores of a younger generation pointer into an older generation object), etc. In general, arbitrarily complex trapping of generation pairs is supported. In the embodiment of FIG. 4, up to 4 generations are supported, although based on this description, those of skill in the art will appreciate suitable modifications for larger numbers of generations.

In one embodiment, field GC_PAGE_MASK and field WB_VECTOR programmably define the behavior of a write barrier to pointer stores. In particular, as described in greater detail below, extended bytecode support provided by hardware processor 100 allows such a write barrier to identify pointer stores from amongst non-pointer stores, and fields GC_PAGE_MASK and WB_VECTOR further allow hardware processor 100 to programmably filter the write barrier to trap a programmably defined set of pointer stores. However, alternative embodiments may forgo the advantageous exact identification of pointer stores provided by the extended bytecode support of hardware processor 100 while still exploiting programmably defined sets of apparent pointer stores in a conservative barrier implementation.

FIG. 4 depicts programmable store filtering support in the context of a four generation collected memory space 450. Garbage collector process 420 includes bytecodes executable on hardware processor 100 for implementing a generational collector in which remembered sets 460 record younger generation pointer stores made by mutator process 410. Exemplary contents of intergenerational pointer store trap matrix 470, which correspond to the contents of field WB_VECTOR, encode a write barrier to a younger generation pointer stores. Tags, which are encoded as described below, for the generation associated with a store data pointer value and the generation associated with the objectref target of a pointer store instruction (e.g., of a aputfield_quick instruction) of mutator process 410 are used to index into intergenerational pointer store trap matrix 470. Based on the exemplary contents of intergenerational pointer store trap matrix 470 element so indexed, write barrier 430 traps the aputfield_quick pointer store if tags associated with value and objectref indicate that a reference to a younger generation object is being stored into an older generation object, invoking garbage collection trap handler (gc_notify) 440.

Based on the description herein, those of skill in the art will appreciate a variety of suitable implementations for garbage collection trap handler 440 which support the particular programmably selected store filtering provided by contents of intergenerational pointer store trap matrix 470 (i.e., of field WB_VECTOR) and/or field GC_PAGE_MASK. In one embodiment in accordance with the exemplary contents (FIG. 4) of intergenerational pointer store trap matrix 470, garbage collection trap handler 440 includes bytecodes executable on hardware processor 100 to store information about the trapping store to a remembered set data structure (including e.g., remembered sets 461, 462, and 463 respectively corresponding to generations 3, 2, and 1 of collected memory space 450).

In another embodiment, contents of intergenerational pointer store trap matrix 470 are programmably defined to trap all pointer stores (intergenerational or otherwise). A related card marking type alternative embodiment of garbage collection trap handler 440 includes bytecodes executable on hardware processor 100 to store information about the trapping store to a card table data structure. In contrast with traditional card marking implementations, the architecture support for garbage collection described herein allows hardware processor 100 to distinguish pointer stores from stores in general, and to distinguish intergenerational pointer stores from pointer stores in general. For these reasons, in another card-marking type embodiment, contents of intergenerational pointer store trap matrix 470 are programmably defined to trap only intergenerational pointer stores.

In both the remembered set style embodiment and the card marking style embodiment, extended bytecode support allows hardware processor 100 to exactly identify pointer stores from amongst non-pointer stores as described in greater detail below. Additionally, the programmable filtering of stores to the heap provided by intergenerational pointer store trap matrix 470 (i.e., by field WB_VECTOR) and write barrier 430 allows hardware processor 100 to identify pointer stores which are intergenerational at mutator process 410 store time, rather than at collection time. For this reason, the term card marking is descriptive of the kind of storage (e.g., a card table) provided by an embodiment of garbage collection trap handler 440 for use by collector process 420 during collection. Usage of the term "card marking" does not imply that all stores need be trapped regardless of whether pointer or literal data is stored.

FIG. 4 also depicts support for garbage collection page based trapping of pointer stores. Field GC_PAGE_MASK provides the programmable mask for comparing a store data pointer value and the objectref target of a pointer store instruction (e.g., of a aputfield_quick instruction). Write barrier 430 traps the pointer store if the garbage collection pages for value and objectref do not match. The additional store filtering providing by field GC_PAGE_MASK and write barrier 430 is particularly useful for collector process 420 implementations on hardware processor 100 in which Hudson's train algorithm (see generally, R. Hudson and J. E. B. Moss, *Incremental Garbage Collection for Mature Objects*, Proceedings of International Workshop on Memory Management, St. Malo, France, Sep. 16–18, 1992) is employed for non-disruptive collection of an oldest generation by an embodiment of collector process 420. Those of skill in the art will recognize suitable implementations wherein garbage collection page size defined by field GC_PAGE_MASK is used to define train "cars" in accordance with Hudson's train algorithm.

By way of example, the syntax of the aputfield_quick bytecode and operation of hardware processor 100 in accordance therewith is as follows:

| Operation: | Set a reference field in object with garbage collection checks |
|---|---|
| Format: | aputfield_quick <br> *offsetbyte 1* <br> *offsetbyte 2* |
| Stack: | . . . , objectref, value <br> . . . |
| Description: | The objectref which must be of type reference, and value, which must also be of type reference, are popped from the operand stack. The value is written to the specified offset into the class instance referenced by objectref. The value of the offset is (offsetbyte1<<8) \| offsetbyte2. |
| Runtime Exceptions: | If the objectref is null, aputfield_quick throws a NullPointerException. <br> The most significant two bits of each of the objectref and value are concatenated to form a four-bit index. This index selects a bit from the 16-bit WB_VECTOR field of the GC_CONFIG register. If the selected bit is set, a gc_notify trap is generated. <br> index=((objectref & 0xC0000000)>>28) \| (value>>30) <br> if(GC_CONFIG.WB_VECTOR[index]==1) <br> generate gc_notify |

Notes:
The opcode of this instruction was originally putfield, operating on a field determined dynamically to have an offset into the class instance data corresponding to a field of type reference.
When the constant pool entry referenced by a putfield instruction is resolved, the offset for the field it references is generated, and the type of the field is determined. The 16-bit offset replaces the two operand bytes of the original putfield instruction. The type of the field determines whether a putfield_quick, putfield2_quick, or aputfield_quick bytecode replaces the original putfield bytecode.

The syntax of an aputstatic_quick bytecode for setting a static reference field in a class (rather than a reference field in an object) and the operation of hardware processor 100 in accordance therewith are analogous.

Fast Garbage Collection Trap Handler

In one embodiment, fast handling of garbage collection is provide by a vectored trap, gc_notify (tt=0x27), priority=17 implemented by trap control logic 170 which triggers an associated garbage collection trap handler 440 including bytecodes executable by hardware processor 100. In one embodiment, a single garbage collection trap handler 440 services each of the above garbage collection traps, whether generated in response to a garbage collection page boundary crossing pointer store or intergenerational pointer store. Since a garbage collection trap occurs before the trapping store is completed, garbage collection trap handler 440 needs to emulate the trapping store in addition to garbage collection functions performed, such as remembered set or card table updating, in order to prevent hardware processor 100 from infinitely trapping. Garbage collection trap handler 440 should then force the PC to the instruction following the store.

JAVA virtual machine instructions affected by garbage collection traps include aputfield_quick, aputstatic_quick, aastore, anewarray, multianewarray, newarray, putfield, putstatic, and new. Of these, only aputfield_quick, aputstatic_quick, and aastore need to perform garbage collection checks, such as dynamic filtering in accordance with contents of fields WB_VECTOR and/or GC_PAGE_MASK described above. The others need only be aware of the garbage collection mechanisms used, for example, properly initializing generational membership tags. In one embodiment, the aastore bytecode traps to an emulation routine and the aastore trap handler performs the appropriate garbage collection checks. One straightforward trap handler implementation gets the arrayref being stored onto the top of the operand stack in the aastore trap handler and executes the bytecode sequence: dup, getfield_quick #0, aputfield_quick #0 to perform the appropriate checks and trap if necessary.

Tagged Reference and Object Formats

Figure 5:
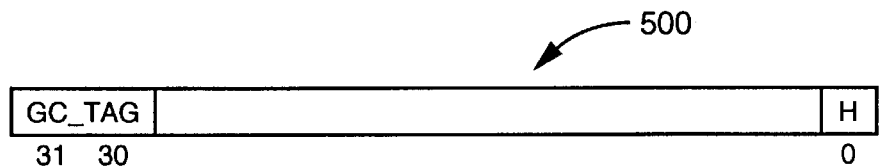
FIG. 5 depicts an object reference (objectref) format in accordance with an embodiment of this invention.

FIG. 5 depicts one embodiment of an object reference (objectref) as represented in hardware processor 100. Three bits of the objectref can be used for garbage collection hints. In particular, a field GC_TAG forms part of an index into register field GC_CONFIG. WB_VECTOR to determine whether write barrier 430 traps a pointer store as described above. In the embodiment of FIG. 5, field GC_TAG encodes generation membership information for use by write barrier 430 as described above. An additional handle bit H indicates whether the object is referenced by the objectref directly or indirectly-through a handle. Handles provide a referencing method that facilitates, albeit at the cost of an additional level of indirection, relocation of memory objects without large-scale updates of pointers (or objectrefs) thereto. Both of these fields are masked out before being provided to integer unit 142 (FIG. 1) of hardware processor 100.

Figure 6A:
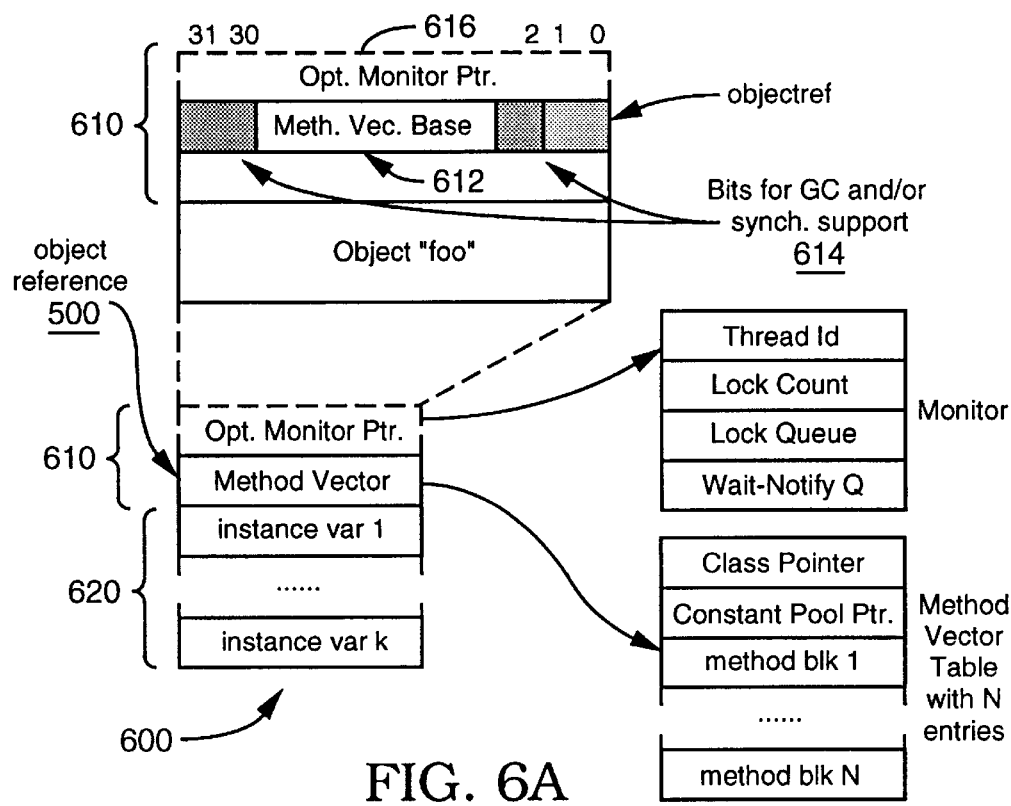
FIG. 6A depicts an object format in accordance with an embodiment of this invention.

In one embodiment of hardware processor 100, an object 600 is represented in memory including a header portion 610 and an instance variable storage portion 620. FIG. 6A depicts one such embodiment. Header portion 610 includes a 32-bit word that itself includes a method vector table base portion 612 for representing object's class and five bits of additional storage 614 reserved for synchronization status of the object and information for the garbage collector. Optionally, a second header-word, e.g., monitor pointer 616, can contain the address of a monitor allocated for the object, thereby making all five bits of additional storage 614 in the first header word available for garbage collection information. In the embodiment of FIG. 6A, an object reference (objectref) points to the location of method vector table base portion 612 to minimize the overhead of method invocation.

Three bits of header portion 610 are available to a garbage collector such as collector process 420. In header portion 610, three lower-order-bits (header[2:0]), and two high-order-bits (header[31:30]) are masked off when the header is treated as a pointer. Three of these bits (header[31:30, 2]) are available to the garbage collector to store information about object 600. Bits 1 and 0 may used to hold LOCK and WANT bits for object synchronization. Alternatively, a second header word, e.g., monitor pointer 616, can be provided for maintaining the synchronization status of object 600, leaving all five bits for garbage collection support. How the bits for garbage collection support are used depends on the particular type(s) of garbage collection methods implemented collector process 420 and garbage collection trap handler 440. Possible uses include mark bits, counter bits to age objects within a generation, etc. As described above, in an optional second header-word embodiment of header portion 610, five bits are available to a garbage collector such as collector process 420.

Figure 6B:
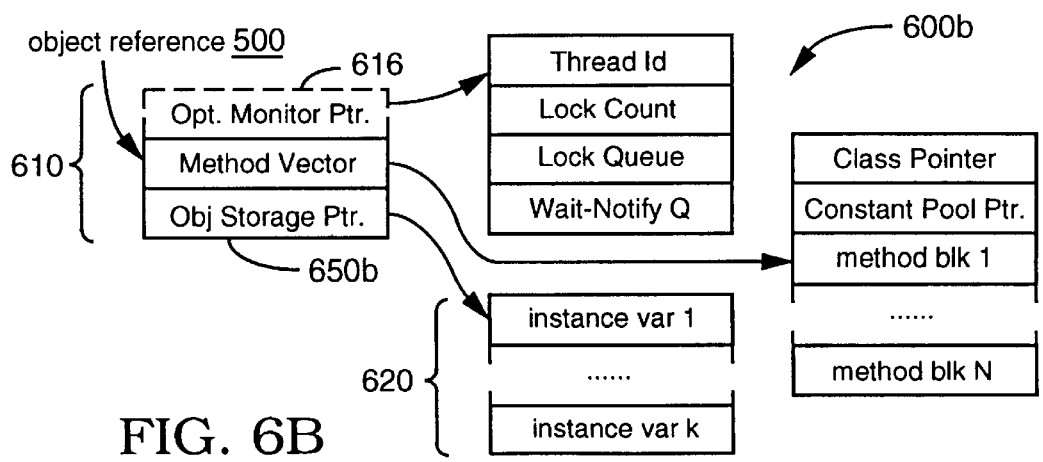
FIG. 6B depicts an alternative handled object format in accordance with an embodiment of this invention.

In the embodiment of FIG. 6A, instance variable storage portion 620 begins one word after the method vector table base portion 612 and contains instance variables of object 600. The least significant bit of an objectref specifies whether the reference is a handled (=1) or not (=0). An alternative, "handled," object format is depicted in FIG. 6B. A handled reference is established when object 600b is created and all subsequent references go through the handle, i.e., storage pointer 650b to access the object. This support is provided for some types of garbage collector which reduce costs of object relocation by copying handles rather than the underlying object storage, including that for instance variables.

Extended Bytecode Support for Dynamic Replacement of Pointer Non-Specific Bytecodes Hardware processor 100 includes features for accelerating execution of JAVA bytecodes by dynamically replacing bytecodes supplied to an execution unit with quick variants thereof. One embodiment of such features is described in the co-pending U.S. patent application Ser. No. 08/788,805 entitled "NON-QUICK INSTRUCTION ACCELERATOR AND METHOD OF IMPLEMENTING SAME," naming Marc Tremblay and James Michael O' Connor as inventors, assigned to the assignee of this application, and filed Jan. 23, 1997, the detailed description of which is incorporated herein by reference. However, as now described, quick bytecode replacement features can also be employed by hardware processor 100 to dynamically replace data-type non-specific store operation bytecodes with pointer-specific store operation bytecodes so as to facilitate implementation of a write barrier for garbage collection.

In one embodiment, putfield and putstatic bytecodes for setting a field in an object or class are dynamically replaced with corresponding quick variants (e.g., putfield_quick, putfield2_quick, or aputfield_quick, and putstatic_quick, putstatic2_quick, or aputstatic_quick). The particular replacement bytecode depends on the type of field being operated upon. For example, a putfield bytecode which is determined to operate on a field of type reference, is dynamically replaced with the aputfield_quick bytecode. Quick bytecode replacement takes advantage of loading and linking work done the first time the associated non-quick bytecode is executed as described in the above-incorporated reference, but more importantly for garbage collection, dynamic replacement with pointer-specific quick bytecodes allows a virtual machine instruction processor such as hardware processor 100 to differentiate between pointer storing and non-pointer storing program occurrences of a data type non-specific store bytecode. Replacement with pointer-specific bytecodes reduces the frequency of trapping stores because only pointer store bytecode variants (i.e., aputstatic_quick or aputfield_quick) need participate in a write barrier implementation.

Figure 7:
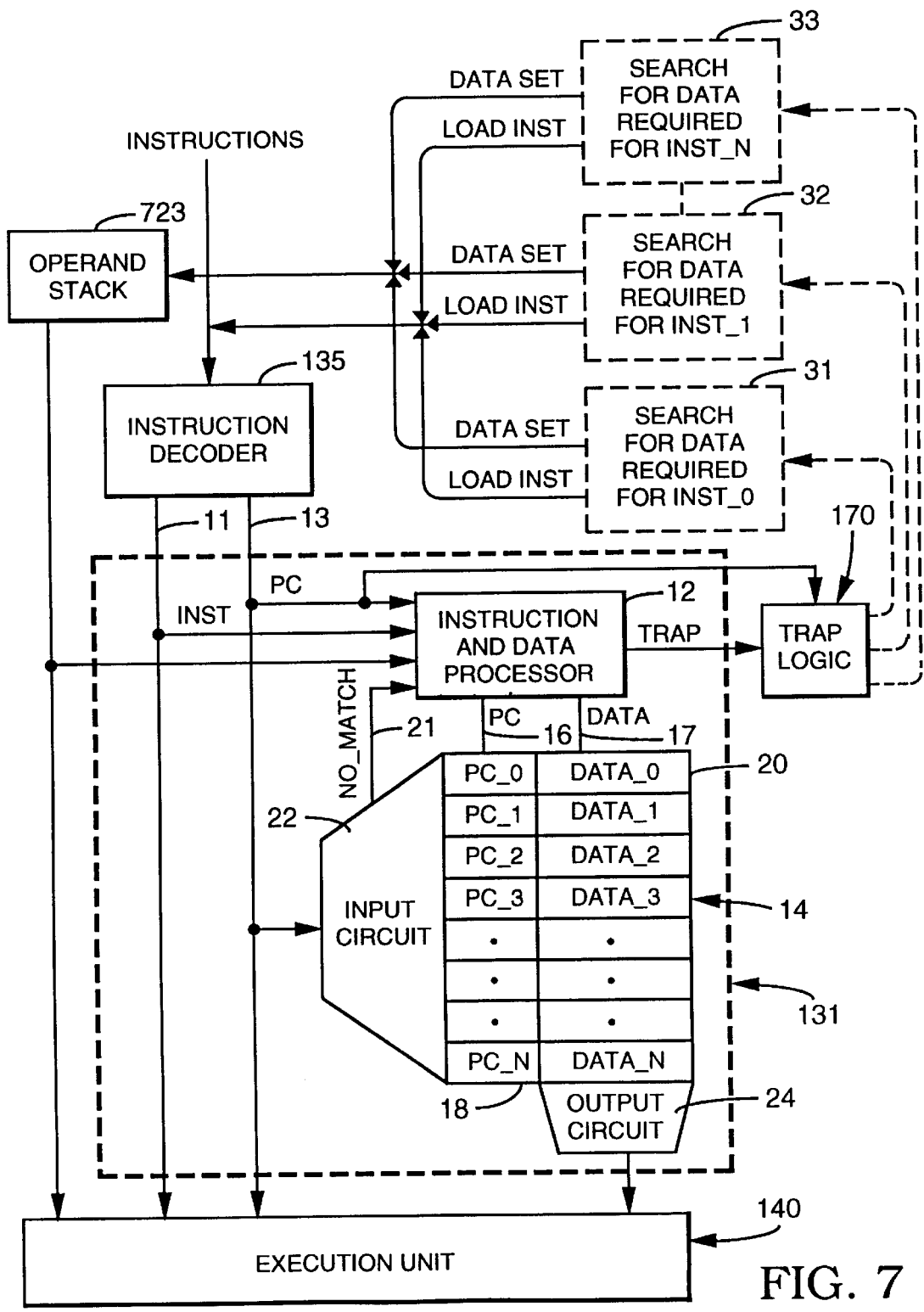
FIG. 7 depicts one embodiment of a bytecode replacement cache employed in accordance with this invention to dynamically replace pointer-non-specific store bytecodes with pointer-specific bytecodes to facilitate trapping of intergenerational and card boundary crossing pointer stores.

One embodiment of dynamic bytecode replacement is now described with reference to FIG. 7. FIG. 7 is a block diagram of a portion of a hardware processor 100 which includes an operand stack 723 which in one embodiment is represented in stack cache 155 (see FIG. 1), instruction decoder 135, non-quick to quick translator cache 131, trap logic circuit 170, software search code 31, 32 and 33 and execution unit 140. Non-quick to quick translator cache 131 includes instruction and data processor 12 and associative memory 14. Associative memory 14, in turn, includes instruction identifier memory section 18, data set memory section 20, input circuit 22 and output circuit 24.

Instruction decoder 135 is coupled to receive a stream of instructions, such as JAVA byte codes, from instruction cache unit 120. Although the present invention is described in connection with JAVA bytecodes, those of skiff in the art will recognize variations for dynamic replacement of other types of instructions in other virtual machine environments based on the description herein. Although the bytecode replacement features described herein are generally applicable to instruction execution acceleration based on execution time resolution of instruction parameters as more generally described in the above-incorporated patent application, the description which follows focuses on the dynamic replacement of pointer non-specific non-quick bytecodes with pointer specific quick variants thereof and on hardware processor 100 for facilities performing this dynamic replacement to facilitate implementation of a write barrier.

Referring to FIG. 7, instruction decoder 135 provides decoded bytecodes on bus 11 and program counter (PC) values corresponding to the decoded bytecodes on bus 13. These bytecodes and PC values are provided to execution unit 140 and to instruction and data processor 12. In addition, the PC values are provided to input circuit 22 of associative memory 14. In general, each of the PC values uniquely identifies a corresponding program occurrence of a bytecode. The top entry of operand stack 723 is provided to instruction and data processor 12.

Within associative memory 14, instruction identifier memory section 18 includes multiple (N) entries. Each of these N entries is capable of storing a corresponding bytecode identifier value, such as bytecode identifier values PC_0, PC_1, PC_2, PC_3, . . . PC_N. Each of the bytecode identifier values stored in instruction identifier memory section 18 corresponds to a different PC value. The width of instruction identifier memory section 18 is selected to correspond with the width of the program counter.

Data set memory section 20 also includes N entries, such that each entry in instruction identifier section 18 has an associated entry in data set section 20. Each of the N entries of data set memory section 20 is capable of storing a data set, such as data sets DATA_0, DATA_1, DATA_2, DATA_3, . . . DATA_N. As described in more detail below, each of the data sets stored in data set memory section 20 includes data for execution of the quick variant of the corresponding program occurrence of a bytecode. In one embodiment, data set memory section 20 has a width of four 32-bit words. However, data set memory section 20 can have other widths in other embodiments.

Instruction and data processor 12 monitors bytecodes provided on bus 11, and determines whether the current bytecode on bus 11 is a non-quick bytecode which is capable of being executed in an accelerated manner if a corresponding data set is readily accessible. If so, a quick variant of the non-quick bytecode together with its corresponding data set will be cached in non-quick to quick translator cache 131. In general, a non-quick bytecode may have 0, 1, or more quick variants. The JAVA virtual machine specification describes the following non-quick bytecodes: anewarray, checkcast, getfield, getstatic, instanceof, invokeinterface, invokespecial, invokestatic, invokevirtual, ldc, ldc_w, ldc2_w, multianewarray, new, putfield, and putstatic, which, in one embodiment of hardware processor 100, have quick variants. For non-quick store-oriented bytecodes, including e.g., putfield, putstatic, and aastore, resolution of constant pool entries corresponding to the target object field allows replacement with a pointer-specific quick variant, e.g., aputfield_quick (set reference field in object with garbage collection checks) or aputstatic_quick (set static reference field in class with garbage collection checks), if the resolution indicates a pointer store operation. If resolution indicates a target object field of a type other than reference (i.e., a non-pointer type), replacement is with a different quick variant, e.g., putfield_quick (set field in object), putfield2_quick (set long or double field in object), putstatic_quick (set static field in class), or putstatic2_quick (set long or double static field in class).

In general, non-quick bytecodes which are capable of accelerated execution if a corresponding data set is readily accessible are hereinafter referred to as non-quick bytecodes having quick variants. Non-quick bytecodes having quick variants form a subset of the bytecodes provided by instruction decoder 135. Instruction and data processor 12 determines whether the current bytecode is a non-quick bytecode having a quick variant by decoding an identify portion (or portions) of the current bytecode. Support is provided by entries in instruction identifier memory and data set memory for up to N program occurrences of non-quick bytecodes having quick variants. Some of these entries can be used for pointer-specific quick variants of non-quick store-oriented (but pointer-non-specific) bytecodes for which a corresponding program occurrence resolves to a pointer store.

Non-quick to quick translator cache 131 operates as follows in response to a current bytecode having a current PC value. Instruction decoder 135 provides the current PC value and the decoded current bytecode to execution unit 140 and to instruction and data processor 12. Instruction and data processor 12 is activated when the decoded bytecode is a non-quick bytecode having a quick variant, a quick variant load bytecode, or a retry bytecode. If the current bytecode provided by instruction decoder 135 on bus 11 is not a non-quick bytecode having a quick variant, a quick variant load bytecode or a retry bytecode, then instruction and data processor 12 does not respond to the bytecode, and instead, the current bytecode and current PC value are provided to execution unit 140 for execution.

However, when the current bytecode is a non-quick bytecode having a quick variant, instruction and data processor 12 is activated in response to the current instruction. In one embodiment, bytecodes putfield and putstatic activate data processor 12. Upon activation, instruction and data processor 12 determines the status of a signal NO_MATCH present on line 21. Initially, the instruction identifier values PC_0, PC_1, PC_2, PC_3, . . . PC_N stored in instruction identifier memory section 18 are set to invalid values. Alternatively, 'valid' bits associated with the instruction identifier values can be cleared. In either case, the current PC value provided to input circuit 22 does not initially match any of the instruction identifier values stored in instruction identifier memory section 18. Consequently, signal NO_MATCH is asserted. The absence of a match between the current PC value and the instruction identifier values PC_0, PC_1, PC_2, PC_3, and PC_N indicates that the data set required to execute the current bytecode is not currently stored in associative memory 14. As a result, instruction and data processor 12 must initially locate and retrieve this data set to allow replacement of the non-quick bytecode with a suitable quick variant.

In response to the asserted signal NO_MATCH and the determination that the current bytecode is a non-quick bytecode having a quick variant, instruction and data processor 12 asserts a control signal TRAP. Control signal TRAP is provided to trap logic 170. In response to control signal TRAP, trap logic 170 temporarily suspends the operation of execution unit 140, and causes a corresponding software code portion 31, 32, or 33 to be accessed. The software code portion accessed is dependent upon the non-quick bytecode which caused control signal TRAP to be asserted.

In one embodiment, trap logic 170 accesses instruction cache unit 120 using the current PC value to identify the particular program occurrence of a bytecode which caused control signal TRAP to be asserted. A switch statement implemented in software directs execution to the appropriate software code portion (in response to the identified bytecode). In alternative embodiments, other methods, such as a trap vector, can be used to direct execution to the appropriate software code portion.

Thus, when the identified bytecode corresponds to a first bytecode INST_0, the switch statement causes corresponding software code portion 31 to be accessed. Similarly, when the identified bytecode corresponds to a second bytecode INST_1, the switch statement causes corresponding software code portion 32 to be accessed. In an exemplary embodiment, first bytecode INST_0 is putfield and second bytecode INST_1 is putstatic. When the identified bytecode corresponds to some other bytecode (illustratively designated INST_N), the switch statement causes a corresponding software code portion 33 to be accessed.

Software code portions 31, 32, . . . 33 locate and retrieve the data sets required to execute bytecodes INST_0 (e.g., putfield), INST_1 (e.g., putstatic), . . . INST_N, respectively. Stated another way, software code portions 31, 32, . . . 33 resolve the constant pool entries for program occurrences of bytecodes INST_0, INST_1, . . . INST_N, respectively. Because some non-quick bytecodes (e.g., putfield and putstatic) have multiple quick variants (e.g., putfield_quick, putfield2_quick, aputfield_quick, putstatic_quick, putstatic2_quick, and aputstatic_quick), the corresponding software code portions also select the appropriate quick variant. If resolution of a corresponding constant pool entry indicates a particular program occurrence of a store-oriented bytecode (e.g., putfield) is a pointer store (e.g., if the store target object field is of type reference), then replacement with a pointer-specific quick variant (e.g., aputfield_quick) is appropriate.

Software code portions 31, 32, . . . 33 further cause the retrieved data sets to be loaded into operand stack 723. Software code portions 31, 32, . . . 33 provide quick variant load bytecodes to instruction decoder 135 after the retrieved data sets are loaded into operand stack 723. Instruction decoder 135 decodes the received quick variant load bytecodes. The decoded quick variant load bytecodes are provided to instruction and data processor 12 on bus 11. Instruction and data processor 12 identifies each quick variant load bytecodes present on bus 11, and in response, retrieves a corresponding data set which was previously loaded into operand stack 723.

Instruction and data processor 12 then loads the current PC value and the retrieved data set into associative memory 14. In one example, the current PC value is written to the first entry of instruction identifier memory section 18 as instruction identifier value PC_0, and the corresponding retrieved data set is written to the first entry of data set section 20 as data set DATA_0. The current PC value is routed from instruction and data processor 12 to memory section 18 on bus 15. The data set is routed from instruction and data processor 12 to data set memory section 20 on bus 17. The method used to select the particular entry within memory 14 can be, for example, random, a least recently used (LRU) algorithm or a first in, first out (FIFO) algorithm.

After the current PC value and the retrieved data set have been written to memory 14, instruction and data processor 12 causes the software code to retry the non-quick instruction which caused control signal TRAP to be asserted. At this time, the current PC value, which is again provided to input circuit 22, matches an instruction identifier value (e.g., instruction identifier value PC_0) stored within the instruction identifier memory section 18. As a result, signal NO_MATCH is not asserted. Consequently, instruction and data processor 12 does not attempt to locate and retrieve a corresponding data set via trap logic 170 and a corresponding one of software code portions 31, 32 . . . 33.

Because the current PC value matches instruction identifier value PC_0, output section 24 passes corresponding data set DATA 0 to execution unit 140. Consequently, execution unit 140 receives the current PC value and the associated data set DATA_0 (including the quick variant bytecode) from non-quick to quick translator cache 131. In response, execution unit 140 executes the quick variant bytecode.

Once the PC value and the data set associated with a non-quick bytecode having a quick variant have been loaded into associative memory 14, the particular program occurrence of the non-quick bytecode having a quick variant can be subsequently executed without resolving the constant pool and without having to access the software code. Furthermore, for a particular program occurrence of a store-oriented bytecode, a pointer-specific quick variant (e.g., aputfield_quick) is subsequently executed if the particular program occurrence resolved to a pointer store, and a non-pointer quick variant (e.g., putfield_quick or putfield_quick) is subsequently executed if the particular program occurrence resolved to a non-pointer (or literal value) store. Moreover, because the non-quick bytecode is not overwritten in the program image, the non-quick bytecode remains available in its original form. In addition, because the non-quick bytecode is not overwritten, the non-quick bytecode can optionally be stored in read only memory.

The following example will further clarify the operation of hardware processor 100, and in particular non-quick to quick translator cache 131 in facilitating a pointer-store-specific embodiment of write barrier 430 for selectively trapping pointer stores by mutator process 410 (FIG. 4). Instruction decoder 135 initially receives non-quick a bytecode (e.g., putstatic) having a quick variant, wherein the particular program occurrence of the non-quick bytecode has a corresponding PC value of 0x0001000. Assuming that the particular program occurrence of bytecode putstatic is not represented in instruction identifier memory section 18, the current PC value of 0x0001000 causes input circuit 22 to assert signal NO_MATCH. In response to signal NO_MATCH and the determination that bytecode putstatic is a non-quick bytecode having a quick variant, instruction and data processor 12 asserts control signal TRAP. Trap logic 170 uses the PC value to identify the current bytecode as bytecode INST_1 (i.e., putstatic). In response to the current bytecode being identified as bytecode INST_1, a software switch statement directs execution to corresponding software code portion 32.

Software code portion 32 then resolves constant pool entries associated with the store target object field, retrieves the data set required to execute bytecode INST_1, and loads this data set onto operand stack 723. Software code portion 32 provides a quick variant load bytecode to instruction decoder 135. In response, instruction decoder 135 provides a decoded quick variant load bytecode to instruction and data processor 12. Instruction and data processor 12 retrieves the data set from operand stack 723 and loads this data set into the first entry of data set memory section 20 as data set DATA_0. Software code portion 32 determines that the store target object field is of type reference (i.e., that the particular program occurrence of putstatic is a pointer store) and includes the appropriate pointer-specific quick variant bytecode aputstatic_quick with data set DATA_0.

Instruction and data processor 12 further loads the current PC value of 0x000100 into the first entry of instruction identifier memory section 18 as instruction identifier value PC_0. Instruction and data processor 12 then causes non-quick bytecode INST_1 (i.e., putstatic) and the current PC value of 0x000100 and to be re-asserted on buses 11 and 13, respectively. In one embodiment, instruction and data processor 12 accomplishes this by issuing a return from trap (ret_from_trap) bytecode which transfers control back to the bytecode that caused the control signal TRAP to be asserted. At this time, input circuit 22 detects a match between the current PC value and instruction identifier value PC_0. In response, associative memory 14 provides the data set associated with instruction identifier value PC_0 (i.e., data set DATA_0 including the pointer-specific quick variant bytecode aputstatic_quick) to output circuit 24. Output circuit 24 passes this data set DATA_0 to execution unit 140 which executes the pointer-specific quick variant bytecode aputstatic_quick.

Other non-quick bytecodes having quick variants and other program instances of the same non quick bytecode subsequently received by instruction decoder 135 are handled in a similar manner. For example, another program occurrence of the non-quick bytecode INST_1 (i.e., putstatic) having an associated PC value of 0x000200 can result in the PC value of 0x000200 being stored in instruction identifier section 18 as instruction identifier PC_1, and the data set associated with instruction INST_1 being stored in data set memory section 20 as data set DATA_1. If this particular program occurrence of bytecode putstatic resolves to a literal value store, the data set associated with instruction identifier value PC_1 (i.e., data set DATA_1) will include a quick variant bytecode such as putstatic2_quick, rather than the pointer-specific quick variant. Note that the data set associated with the first program occurrence of non-quick bytecode INST_1 (e.g., data set DATA_0) may not be the same as the data set associated with the second program occurrence of non-quick bytecode INST_1 (e.g., data set DATA_1).

By resolving the two program occurrences of the bytecode putstatic, the first to a pointer-specific store bytecode aputstatic_quick and the second to a non-pointer store bytecode putstatic2_quick), non-quick to quick translator cache 131 of hardware processor 100 restricts write barrier 430 to pointer stores. In one embodiment, the bytecode aputstatic_quick sets a reference field in a target object with garbage collection checks. As described above with reference evaluation of bytecode aputfield_quick by hardware processor 100, write barrier 430 (as implemented by the pointer-specific quick variant bytecode) forms a four-bit index by concatenating the most significant two bits of each of the objectref and value operand thereto. This index selects a bit from the 16-bit field WB_VECTOR of register GC_CONFIG. If the selected bit is set a trap gc_notify is generated.

index=((objectref & 0xC0000000)>>28)|(value>>30) if(GC_CONFIG. WB_VECTOR[index]==1) generate gc_notify In one embodiment of execution unit 140 (FIG. 1), logic circuits for bytecode evaluation couple to register GC_CONFIG (FIG. 4) thereby implementing the above logic expression. Those of skill in the art will recognize a variety of suitable implementations.

In another embodiment, write barrier 430 (as implemented by the pointer-specific quick variant bytecode) supports both intergenerational store trapping and garbage collection page boundary crossing pointer store trapping. As before, this embodiment of write barrier 430 forms a four-bit index by concatenating the most significant two bits of each of the objectref and store_data operand thereto. This index selects a bit from the 16-bit field WB_VECTOR of register GC_CONFIG. If the selected bit is set, a trap gc_notify is generated. However, a second trigger is also provided by comparison of masked portions of the objectref and store_data operands. The mask is programmably defined by field GC_PAGE_MASK, i.e., bits 27:16, of register GC_CONFIG. This second trigger is guarded a garbage collection pages enabled bit GCE of processor state register PSR.

```
if{(GC_CONFIG[(objectref[31:30]##store_data[31:30])]==1)
   OR ((PSR.GCE==1) AND
       ((store_data[31:12] & 0x3F##GC_CONFIG[27:16])!=
        (objectref[31:12] & 0x3F##GC_CONFIG[27:16)) }
       then trap
```

In one embodiment of execution unit 140 (FIG. 1), logic circuits for bytecode evaluation couple to register GC_CONFIG (FIG. 4) thereby implementing the above logic expression. Those of skill in the art will recognize a variety of suitable implementations.

An advantageous alternative embodiment of write barrier 430 provides a mechanism to restrict garbage collection page boundary crossing checks to a particular generation or generations, typically an oldest generation, of a collected memory space. Modified page check trapping equations, e.g.,

```
if (((PSR.GCE==1) ||
     ((objectref[31:30) == store_data[31:30]) &&
     (GEN_PAGE_CHECK_ENABLE[objectref[31:30]]==1))) &&
    ((objectref[31:12] & 0x3F##GC_PAGE_MASK) !=
     (store_data[31:12] & 0x3F##GC_PAGE_MASK)))
    then trap
``` require that generation tag bits (e.g., bits 31:30) of the objectref and store_data operands be equal. To allow flexibility for encoding an oldest generation, four otherwise unused bits of register GC_CONFIG (e.g., bits 31:28) can be used to encode field GEN_PAGE_CHECK_ENABLE. This four-bit filed indicates which generation or generations to which trapping of garbage collection page boundary crossing stores will be restricted. Those of skill in the art will recognize a variety of suitable implementations, including implementations integrating the generation specific, garbage collection page boundary crossing store trapping with inter-generational pointer store trapping described above.

As described above, operation of non-quick to quick translator cache 131 replaced the original bytecode putfield, which was determined to operate on a field having an offset into the class instance data corresponding to a field of type reference, with bytecode aputfield_quick. When the constant pool entry referenced by a putfield instruction was resolved, the offset for the field it referenced was generated and the type of the field was determined to be type reference. The 16-bit offset, which is included in the corresponding data set DATA_1 of non-quick to quick translator cache 131, replaces the two operand bytes of the original putfield instruction. The type of the field determined that an aputfield_quick bytecode, rather than a putfield_quick or putfield2_quick bytecode, replaced the original putfield bytecode. Depending on the contents of the fields WB_VECTOR and GC_PAGE_MASK of register GC_CONFIG, write barrier 430 (partially implemented in one embodiment by quick variant bytecode aputfield_quick) may trap the pointer store as described above.

The forgoing description details one embodiment of dynamic bytecode replacement for hardware processor 100. An alternative embodiment of dynamic bytecode replacement is based on self-modifying code. In light of the description of non-quick to quick translator cache 131, self-modifying code embodiments are advantageous when implementation of a cache is impractical or undesireable (e.g., for cost reasons). In such a case, non-quick to quick translator cache 131 can be eliminated. Instead, trap code, e.g., software code portions 31, 32 . . . 33, replaces the original non-quick bytecode with an appropriate quick variant thereof by writing directly into the instruction space so that subsequent executions of the particular program occurrence of the original non-quick bytecode will evaluate the quick variant. One embodiment of a self-modifying code based dynamic bytecode replacement mechanism is described in U.S. Pat. No. 5,367,685, the detailed description of which is hereby incorporated by reference.

Garbage Collection Examples

Use of the above-described architectural support for garbage collection is now described in the context of three generational collector approaches: an implementation of Ungar's remembered set generational collector, an implementation of Wlson's card table based generational collector, and an implementation of Hudson's train algorithm-based collector.

Remembered Set-based Generational Collector

Figure 8:
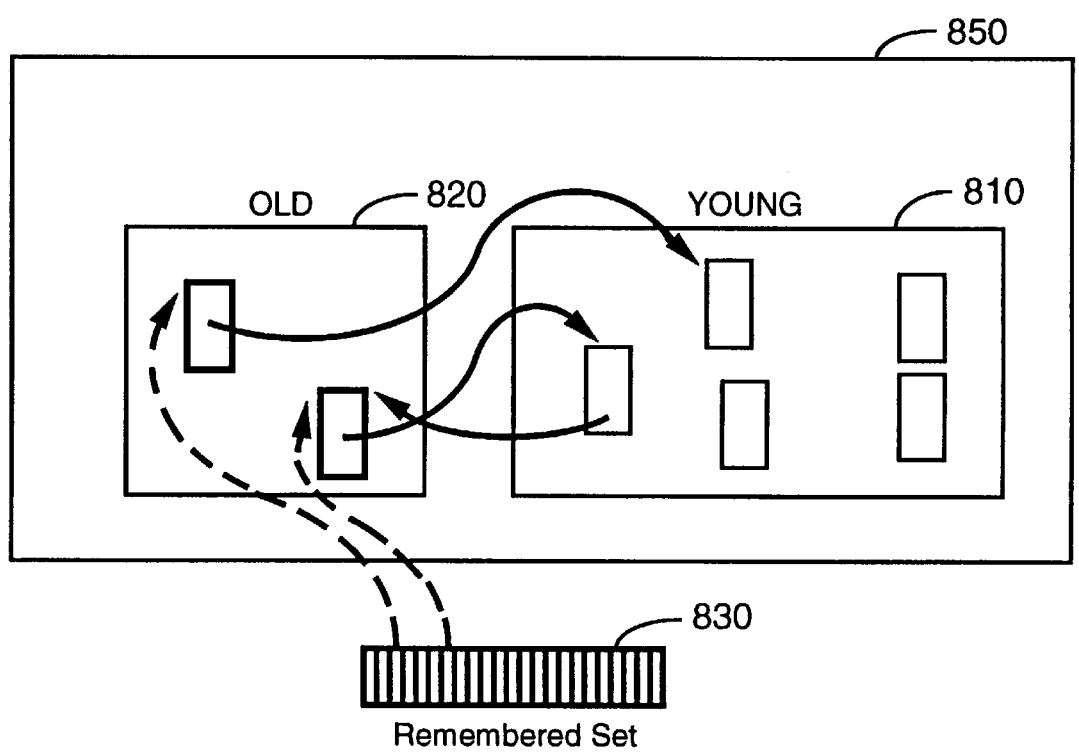
FIG. 8 depicts an illustrative remembered set based generational collector approach that can be supported by architectural support for garbage collection in accordance with this invention.

FIG. 8 depicts generational garbage collection using a remembered set after Ungar. An implementation (including e.g., write barrier 430, collector process 420, and garbage collection trap handler 440) of this garbage collection approach can advantageously exploit the features of hardware processor 100 in the following manner:

1. Not all stores need to trap. In particular, only stores of pointers into the heap need to be checked. Use of the above-described aputfield_quick and aputstatic_quick bytecodes allows checks of only such pointer stores. Furthermore, stores to an operand stack or to local variables area represented in stack cache 155 need not trap if the operand stack, local variables, and static areas are assumed to be part of the root set. Object references represented in entries of stack cache 155 can be identified as pointers as described in co-pending U.S. patent application Ser. No. 08/842,063, now U.S. Pat. No. 5,903,899, entitled, "SYSTEM AND METHOD FOR ASSISTING EXACT GARBAGE COLLECTION BY SEGREGATING THE CONTENTS OF A STACK INTO SUBSTACKS," naming Guy L. Steele, Jr. as inventor, filed on even date herewith or in co-pending U.S. patent application Ser. No. 08/838,971 entitled, "APPARATUS AND METHOD FOR ASSISTING EXACT GARBAGE COLLECTION BY USING A STACK CACHE OF TAG BITS," naming Ole Agesen, Steve Heller, James Michael O' Connor, Guy L. Steele, Jr., and Marc Tremblay as inventor, filed on even date herewith. The detailed description of each patent application is hereby incorporated by reference herein.

2. As described above, write barrier 430 support of hardware processor 100 traps if the objectref of a younger-generation-object is being stored into an older generation object.

3. In an embodiment in which only two generations are supported within collected memory space 850, field WB_VECTOR of register GC_CONFIG contains the value 0x5050. Only one bit of field GC_TAG (i.e., bit 30) of the objectref is considered. In one embodiment, a value of zero (0) identifies the objectref as pointing to an object in young generation 810, while a value of one (1) identifies the objectref as pointing to an object in old generation 820. In this embodiment, bit 31 can be effectively ignored. Embodiments for larger numbers of generations will be apparent to those of skill in the art. In accordance with the contents of field WB_VECTOR, write barrier 430 triggers garbage collection trap handler 440 whenever a pointer from an old generation 820 object into a young generation 810 object is stored. In this embodiment, the PSR.GCE bit is set to zero (0), disabling write barrier 430 operations based on contents of field GC_PAGE_MASK.

4. The trap condition for the stores is:.

if{(GC_CONFIG[(objectref[31:30]##store_data[31:30])]==1)
   OR ((PSR.GCE==1) AND
      ((store_data[31:12] AND 0x3F##GC_CONFIG[27:16])!=
       (objectref[31:12] AND 0x3F##GC_CONFIG[27:16)) }
      then trap where store_data is the 32-bit pointer which is being stored into the target object and objectref is the 32-bit pointer to the object into which the store is being made.

5. When the hardware processor 100 traps, i.e., when write barrier 430 triggers garbage collection trap handler 440, execution of hardware processor 100 jumps garbage collection trap handler 440. In an embodiment, garbage collection trap handler 440 stores information to remembered set 830 and emulates the trapping pointer store.

6. During garbage collection, objects promoted from young generation 810 to old generation 820, the field GC_TAG of all references to the promoted object is updated to reflect that the promoted object is part of the older generation.

Card Table Based Generational Collector

For a card-based generational collector implementation, the field WB_VECTOR of register GC_CONFIG is set to 0xFFFF. This causes write barrier 430 to trap all pointer stores to the heap and trigger a trap handler, such as garbage collection trap handler 440. In such a card-based generational collector embodiment, garbage collection trap handler 440 performs an additional store to a card table data structure and emulates the trapping store. In contrast with a traditional card-based generational collector implementation after Wilson, the embodiment described traps only pointer stores. In an alternative embodiment, field WB_VECTOR of register GC_CONFIG is set an appropriate value to define trapping behavior of write barrier 430 corresponding to only pointer stores which are also intergenerational. In this way, collection time scanning can be restricted to cards for which an intergenerational pointer store occurred. In such an embodiment, the card table advantageously provides a duplicate removal function as contrasted with the above-described remembered set embodiment.

Train Algorithm-Based Collectors

Hudson's train Algorithm is popular for allowing non-disruptive collection of an oldest generation of a generational system. It works using a write barrier to keep track of references between different memory regions ("cars") within the oldest generation. In an hardware processor 100 implementation, these "cars" are defined as fixed, power-of-two sized regions that are aligned on power-of-two boundaries. Field GC_PAGE_MASK defines operation of write barrier 430 for this class of garbage collection algorithms. If processor state register bit PSR.GCE is set to one, any pointer stores that cross a garbage collection page boundary (as defined by field GC_PAGE_MASK) causes write barrier 430 to trigger garbage collection trap handler 440. In such an embodiment, garbage collection trap handler 440 manages the . Page ("car") size is programmably-defined based on field GC_PAGE_MASK of register GC_CONFIG. Page ranges from 4 KBytes to 8 MBytes are supported in the above-described embodiment.

Other Collectors

Some real-time garbage collectors that depend on write barriers have been developed. Implementations of these garbage collectors can exploit the pointer specific feature of write barrier 430. Incremental mark-sweep collectors, such as that proposed by Steele (see Guy L. Steele, *Multiprocessing Compactifying Garbage Collection,* Communications of the ACM, 18(9) (1975)) can also exploit the pointer specific feature of write barrier 430.

While the invention has been described with reference to various embodiments, it will be understood that these embodiments are illustrative and that the scope of the invention is not limited to them. Claim terms such as first instruction, second instruction, third instruction, etc. are for identification only and should not be construed to require a particular ordering of instructions. Many variations, modifications, additions, and improvements of the embodiments described are possible. For example, although the present invention has been herein described with reference to exemplary embodiments relating to the JAVA programming language and JAVA virtual machine, it is not limited to them and, instead, encompasses systems, articles, methods, and apparati for a wide variety of processor environments.

In addition, although certain exemplary embodiments have been described in terms of hardware, software (e.g., interpreter, just-in-time compiler, etc.) implementations of a virtual machine instruction processor employing various of a intergenerational pointer store trap matrix, object reference generation tagging, a write barrier responsive the intergenerational pointer store trap matrix and object reference generation tagging, a garbage collection trap handler, and/or facilities for selective dynamic replacement of pointer-non-specific instructions with pointer-specific instructions with write barrier support are also suitable. These and other variations, modifications, additions, and improvements may fall within the scope of the invention as defined by the claims which follow.

What is claimed is:

1. An apparatus comprising:
    dynamically allocated storage wherein references to objects formed therein have generation membership tags associated therewith;
    an intergenerational pointer store trap matrix including elements corresponding to store target object and store reference data generation pairs, wherein individual of said elements indicate whether said barrier should trap pointer stores of corresponding store reference data to a corresponding store target object; and
    a write barrier to intergenerational pointer stores, wherein said write barrier traps a store instruction in response to selected correspondences between respective generation membership tags of a target object reference and of object reference data being stored into a target object identified by said target object reference, said selected correspondences encoded by said intergenerational pointer store trap matrix.

2. An apparatus, as recited in claim 1, wherein said write barrier comprises logic responsive to a write barrier vector register encoding said intergenerational pointer store trap matrix and responsive to object references respectively encoding said generation membership tags of a target object reference and of object reference data, said logic providing a generation membership tag-oriented lookup into said write barrier vector register.

3. An apparatus, as recited in claim 1,
    wherein said generation membership tags comprise maskable portions of said target object reference and of said object reference data; and
    wherein said write barrier comprises logic responsive to states of said maskable portions and of a write barrier vector register encoding said intergenerational pointer store trap matrix.

4. An apparatus, as recited in claim 1, wherein said write barrier comprises a pointer store specific hardware write barrier, pointer store specificity thereof being provided by replacement of pointer non-specific store instructions with pointer-specific store instructions in accordance with execution-time resolution of a store target field type of said pointer non-specific store instructions.

5. An apparatus, as recited in claim 1, wherein said write barrier comprises logic responsive to said generation tags associated with said target object reference and said object reference data and to a write barrier vector register encoding said intergenerational pointer store trap matrix.

6. An apparatus, as recited in claim 1,
    wherein said dynamically allocated storage comprises a heap represented in memory; and
    wherein generations of said objects are represented in contiguous regions of said memory.

7. An apparatus, as recited in claim 1,
    wherein said dynamically allocated storage comprises a heap represented in memory;
    wherein generations of said objects are represented in not necessarily contiguous regions of said memory; and
    wherein said references to said objects include an addressing portion and a maskable generation tag portion, said write barrier being responsive to said maskable generation tag portion.

8. An apparatus, as recited in claim 1, embodied in a hardware processor.

9. An apparatus, as recited in claim 1, embodied as a computer software program product including instructions executable on a hardware processor and encoded in a computer readable medium.

10. An apparatus, as recited in claim 9, wherein said computer readable medium is selected from a set comprising a disk medium, a CD-ROM medium, an addressable memory medium, and a network communication medium.

11. An apparatus, as recited in claim 1, further comprising:
- a virtual machine instruction processor including a representation of said intergenerational pointer store trap matrix;
- wherein said write barrier comprises pointer specific store instruction codes executable on said virtual machine instruction processor; and
- wherein execution of said pointer specific store instruction codes includes determining, based on generation tags respectively associated with said target object reference and said object reference data, whether a particular execution of one of said pointer specific store instructions will store an intergenerational pointer indicated as for trapping by said intergenerational pointer store trap matrix, and, if so, trapping to a garbage collection fault handler.

12. An apparatus, as recited in claim 11, wherein said virtual machine instruction processor includes a hardware processor to directly execute at least a subset of virtual machine instructions executable thereby.

13. An apparatus, as recited in claim 11,
- wherein said virtual machine instruction processor includes a hardware processor to directly execute at least a subset of virtual machine instructions executable thereby; and
- wherein said hardware processor includes logic responsive to a write barrier vector register encoding said intergenerational pointer store trap matrix and responsive to object references respectively encoding said generation membership tags of a target object reference and of object reference data, said logic effectively implementing a generation membership tag oriented lookup into said write barrier vector register.

14. An apparatus, as recited in claim 11,
- wherein said virtual machine instruction processor includes an interpreter executable on a hardware processor; and
- wherein said intergenerational pointer store trap matrix is represented in storage accessible to said hardware processor.

15. An apparatus, as recited in claim 11,
- wherein said virtual machine instruction processor includes a just-in-time compiler executable on a hardware processor; and
- wherein said intergenerational pointer store trap matrix is represented in storage accessible to said hardware processor.

16. An apparatus, as recited in claim 11, wherein said virtual machine instruction processor dynamically replaces pointer non-specific store instruction codes with said pointer specific store instruction codes in accordance with first execution time resolution of data type, thereby restricting said write barrier to pointer stores, said intergenerational pointer store trap matrix further restricting traps by said write barrier to intergenerational pointer stores.

17. An apparatus, as recited in claim 1, further comprising:
- a virtual machine instruction processor including an implementation of said write barrier and a representation of said intergenerational pointer store trap matrix;
- a fault handler including instructions executable by said virtual machine instruction processor, wherein said write barrier triggers said fault handler coincident with execution of a store instruction having a target object and store data such that said store instruction stores an intergenerational pointer.

18. An apparatus, as recited in claim 17, wherein said instructions of said fault handler include instructions for storing to a remembered set.

19. An apparatus, as recited in claim 17,
- further comprising a generational collector process of instructions executable by said virtual machine instruction processor; and
- wherein said fault handler includes instructions executable by said virtual machine instruction processor for storing information identifying trapped store data to a remembered set representation for use by said generational collector process.

20. An apparatus, as recited in claim 1, wherein said target object reference and said object reference data each reference object structures in said dynamically allocated storage, said object structures including method and instance variable representations.

21. An apparatus, as recited in claim 1, wherein said target object reference and said object reference data are each pointers to literal data represented in dynamically allocated storage.

22. An apparatus, as recited in claim 1, further comprising a hardware processor including a register representation of said intergenerational pointer store trap matrix and an execution unit having a logic circuit for evaluating said selected correspondences.

23. An apparatus, as recited in claim 1, further comprising a software virtual machine instruction processor program executable on a hardware processor, said software virtual machine instruction processor program defining computer readable storage for representing said intergenerational pointer store trap matrix and including program instructions for evaluating said selected correspondences.

24. A method for trapping intergenerational pointer stores comprising:
- forming an intergenerational pointer store trap matrix in computer readable storage, the intergenerational pointer store trap matrix including elements corresponding to store target object and store reference data generation pairs, wherein individual of said elements indicate whether said barrier should trap pointer stores of corresponding store reference data to a corresponding store target object;
- indexing into said intergenerational pointer store trap matrix using generation membership tags respectively associated with a target object reference and object reference data being stored thereinto by a mutator process store operation; and
- selectively trapping based on upon a trap indication encoded at an element of said intergenerational pointer store trap matrix so indexed.

25. A method, as recited in claim 24, further comprising:
completing said mutator process store operation without trapping based upon a no trap indication encoded at said indexed element.

26. A method, as recited in claim 24, wherein handling of said trapping includes:
storing a remembered set entry corresponding to said mutator process store operation.

27. A method, as recited in claim 24, wherein handling of said trapping includes:
emulating said mutator process store operation.

28. A method, as recited in claim 24, further comprising:
selectively transforming pointer non-specific mutator store operation instructions into pointer specific instructions based on an execution-time determination of store target field type; and
performing said indexing into said intergenerational pointer store trap matrix for substantially only said pointer specific instructions.

29. A method, as recited in claim 24, embodied in operations of a hardware processor.

30. A method, as recited in claim 24, embodied as a computer software program product including instructions executable on a hardware processor and encoded in a computer readable medium.

31. A method, as recited in claim 30, wherein said computer readable medium is selected from a set comprising a disk medium, a CD-ROM medium, an addressable memory medium, and a network communication medium.

* * * * *

UNITED STATES PATENT AND TRADEMARK OFFICE
CERTIFICATE OF CORRECTION

PATENT NO. : 6,098,089
ISSUE DATE : August 1, 2000
INVENTOR(S) : O'Connor, James Michael; Tremblay, Marc; Vishin, Sanjay It is certified that error appears in the above-identified patent and that said Letters Patent is hereby corrected as shown below:

Col. 10, Line 57, delete "stores" and insert --store--.

Signed and Sealed this

Twenty-second Day of May, 2001

*Attest:*

NICHOLAS P. GODICI

*Attesting Officer*     Acting Director of the United States Patent and Trademark Office